US012758831B2

(12) United States Patent
Power et al.

(10) Patent No.: US 12,758,831 B2
(45) Date of Patent: Oct. 13, 2026

(54) BRAZING A GOLF CLUB HEAD WITH A MITER JOINT USING TWO DIFFERENT BRAZING ALLOYS

(71) Applicant: Topgolf Callaway Brands Corp., Carlsbad, CA (US)

(72) Inventors: Alex Power, Carlsbad, CA (US); Eric Itokazu, Carlsbad, CA (US); Patrick Davis, Carlsbad, CA (US); Matthew Myers, Carlsbad, CA (US)

(73) Assignee: Callaway Golf Company, Carlsbad, CA (US)

( * ) Notice: Subject to any disclaimer, the term of this patent is extended or adjusted under 35 U.S.C. 154(b) by 21 days.

(21) Appl. No.: 19/312,088

(22) Filed: Aug. 27, 2025

(65) Prior Publication Data

US 2025/0387844 A1 Dec. 25, 2025

Related U.S. Application Data

(60) Division of application No. 18/915,799, filed on Oct. 15, 2024, now Pat. No. 12,434,314, which is a continuation of application No. 18/913,116, filed on Oct. 11, 2024, now Pat. No. 12,377,322, which is a continuation-in-part of application No. 18/903,297, filed on Oct. 1, 2024, which is a continuation-in-part of application No. 18/232,979, filed on Aug. 11, (Continued)

(51) Int. Cl.

| | |
|---|---|
| ***A63B 53/04*** | (2015.01) |
| ***B23K 1/00*** | (2006.01) |
| ***B23K 1/008*** | (2006.01) |
| *B23K 35/30* | (2006.01) |
| *B23K 103/24* | (2006.01) |

(52) U.S. Cl.

CPC .......... *A63B 53/042* (2020.08); *A63B 53/047* (2013.01); *B23K 1/0008* (2013.01); *B23K 1/008* (2013.01); *A63B 2209/00* (2013.01); *B23K 35/302* (2013.01); *B23K 35/3033* (2013.01); *B23K 2103/24* (2018.08)

(58) Field of Classification Search

CPC .... B23K 1/0008; B23K 1/008; B23K 35/302; B23K 35/3033; A63B 53/042; A63B 53/047; A63B 2209/00

See application file for complete search history.

(56) References Cited

U.S. PATENT DOCUMENTS

| | | | | | |
|---|---|---|---|---|---|
| 6,027,010 | A * | 2/2000 | Shira | A63B 60/00 | 228/122.1 |
| 6,368,233 | B1 * | 4/2002 | Chen | A63B 53/0466 | 473/345 |

(Continued)

FOREIGN PATENT DOCUMENTS

JP 10192454 A * 7/1998

*Primary Examiner* — Keith Walker
*Assistant Examiner* — Carlos J Gamino
(74) *Attorney, Agent, or Firm* — Michael A. Catania; Daniel Moderick

(57) ABSTRACT

A golf club head with a mitered joint for joining components of dissimilar materials is disclosed herein. The golf club head has a body with an internal edge defining a recess, and a face component having an internal edge. The face component is disposed over the recess. The internal edge of the body and the internal edge of the face have an angle ranging from about 10 degrees to about 80 degrees.

10 Claims, 24 Drawing Sheets

Related U.S. Application Data

2023, now Pat. No. 12,157,038, which is a continuation-in-part of application No. 18/222,031, filed on Jul. 14, 2023, now Pat. No. 12,599,982.

(60) Provisional application No. 63/432,925, filed on Dec. 15, 2022, provisional application No. 63/390,319, filed on Jul. 19, 2022.

(56) References Cited

U.S. PATENT DOCUMENTS

| | | | | |
|---|---|---|---|---|
| 6,605,371 | B1 * | 8/2003 | Ueda | B23K 35/3033 428/677 |
| 2001/0055996 | A1 * | 12/2001 | Iwata | A63B 53/04 473/350 |
| 2006/0079349 | A1 * | 4/2006 | Rae | A63B 53/0466 473/345 |
| 2008/0029496 | A1 * | 2/2008 | Lin | B23K 1/0056 219/121.64 |
| 2010/0056298 | A1 * | 3/2010 | Jertson | A63B 60/00 228/101 |
| 2012/0172147 | A1 * | 7/2012 | McDonnell | A63B 53/0466 473/346 |
| 2013/0324305 | A1 * | 12/2013 | Hayase | B29C 66/53461 156/60 |
| 2021/0046360 | A1 * | 2/2021 | Demkowski | A63B 53/047 |

* cited by examiner

1000

1100

BRAZING A GOLF CLUB HEAD WITH A MITER JOINT USING TWO DIFFERENT BRAZING ALLOYS

CROSS REFERENCES TO RELATED APPLICATIONS

The Present Application is a divisional application of U.S. patent application Ser. No. 18/915,799, filed on Oct. 15, 2024, which is a continuation application of U.S. patent application Ser. No. 18/913,116, filed on Oct. 11, 2024, now U.S. Pat. No. 12,377,322, issued on Aug. 5, 2025, which is a continuation-in-part application of U.S. patent application Ser. No. 18/903,927, filed on Oct. 1, 2024, which is a continuation-in-part application of U.S. patent application Ser. No. 18/232,979, filed on Aug. 11, 2023, now U.S. Pat. No. 1,257,038, issued on Dec. 3, 2024, which claims priority to U.S. Provisional Patent Application No. 63/432,925, filed on Dec. 15, 2022, and U.S. Patent application Ser. No. 18/232,979 is a continuation in-part application of U.S. patent application Ser. No. 18/222,031, filed on Jul. 14, 2023, which claims priority to U.S. Provisional Patent Application No. 63/390,319, filed on Jul. 19, 2022, each of which is hereby incorporated by reference in its entirety.

STATEMENT REGARDING FEDERALLY SPONSORED RESEARCH OR DEVELOPMENT

Not Applicable

BACKGROUND OF THE INVENTION

Field of the Invention

The present invention relates to golf club heads. More specifically, the present invention relates to brazing components of golf club heads made of dissimilar materials.

Description of the Related Art

In the process of brazing, joint design is paramount for the success of the brazing process. Multiple joint types are used in products in the golf club industry, including tongue-and-groove, scarf, lap, and butt joints, each appropriate depending on the geometry, materials to be joined, and brazing compound. Each of these joints has strengths and drawbacks.

For example, specifically for brazing a face plate to a club body, the tongue-and-groove joint, or variations on it like the butt-lap joint, are used. While the tongue-and-groove joint is considered a strong and versatile joint, for typical golf geometries, it requires precise fitment with high tolerances and tight corners on both components to be brazed, and typically about 30% more width to the joint than needed for structural integrity, making it an expensive joint in both cost to manufacture and volume/weight, and is often impractical in thinner cross-sectional locations in golf clubs, thus either resulting in placing the joint in a less desirable location, adding material where it is detrimental for mass properties, or forcing a transition into a butt or scarf joint which are weaker and less likely to yield a successful joint, potentially reducing process yield. Furthermore, while a secure joint that promotes a successful brazing process, the tongue-and-groove's tight corners can function as stress concentrators when used in highly stressed regions of the golf club. Finally, the requirements for a larger width of the joint limits the locations where the joint can be implemented, often forcing an interface of a thin portion of one of the components to be interfaced to a thick portion of the other component, resulting in challenges with heat management, which is a major driver for the success of the brazing process and thus further compounds the process.

The prior art discloses various means of affixing golf club components made of dissimilar materials to one another.

Chen, U.S. Pat. No. 5,198,062 discloses a method of making a club head including molding a fiber bulk molding compound.

Chen, U.S. Pat. No. 5,403,007, discloses a golf club head including a hollow metal main body having a recess corresponding in location to a striking surface, the recess having a back wall of metal, a rigid ball-hitting plate adhered in the recess with an adhesive reinforcing layer pre-impregnated with resins.

Chen, U.S. Pat. No. 5,435,551, discloses a club head of composite material including a metal body, a composite shell, and a rod member located on the sole.

Chen, U.S. Pat. No. 5,683,310, discloses a metal golf club head having a neck, heel and face of a light alloy, and a top, toe and sole of a metal heavier than the light alloy.

Chen, U.S. Pat. No. 5,871,408, discloses a method of manufacturing a metal striking plate with a metal golf club head case by baking welding material located on a shoulder of the case.

Chen, U.S. Pat. No. 6,458,045, discloses a golf club head including a metal main body and a ball hitting plate, the main body having a front face, a cavity, an annular joining face extending along a fringe of the front face, and a trench circumventing the annular joining face, the back of the ball-hitting plate being attached to the annular joining face, a brazing solder held in the trench securing the plate to the main body.

Chen, U.S. Pat. No. 6,506,129, discloses a golf club head including a metal rear seat member and a metal front member, the front member having a plate and an extension portion extending rearward about the perimeter of the plate and soldered to the rear seat member, a flexure space formed between the back of the plate and the rear seat member, the plate decreasing in thickness from a central portion to the perimeter.

Chen, U.S. Pat. No. 6,743,120, discloses an iron head including a first head member (neck, heel & face) having a first concavity, and a second head member (toe, top and sole) having a second concavity, the first and second head members being soldered together.

Chen, U.S. Pat. No. 7,008,331, discloses an iron head including a head body having a front recess and an annular shoulder portion around the recess, a soft metal layer disposed in the front recess, a thin face plate fixed to the front side of the head body and covering a front edge of the shoulder portion of the head body, and a solder layer bonding the face plate to the front edge of the shoulder portion and to the soft metal layer.

Chen, U.S. Pat. No. 7,662,051, discloses a club head including a main part made of metal and including a body portion and a neck portion, a hitting part made of a metal harder than that of the main part and including a face portion and bottom (sole) portion, wherein the back of the face portion and top of the bottom portion of the hitting part remain suspended in midair.

Chen, U.S. Pat. No. 6,368,233, discloses a wooden-type golf club including a main body having an annular notch, and an arcuate shell that is welded to the notch, the arcuate shell including an annular piece that is made of the same material as the main body and a main piece that is made of a different material than the main body.

Chen, U.S. Pat. No. 6,450,896, discloses a golf club head including a metal cast hollow shell, a metal ball hitting plate, the hollow shell having a neck seat provided with a through hole, and a metal neck tube lodged in the through hole of the neck seat, an inner wall of the through hole having a brazing layer fusing the neck tube with the shell.

Chen, U.S. Pat. No. 6,749,524, discloses a golf club head including a metal shell having a recess, a fringe circumscribing the recess and having one of an annular projection or an annular recess, and a metal ball-striking plate having on its back side the other of the annular projection or the annular recess, the ball-striking plate and metal shell having a tongue and groove fit and being welded together.

Chen, U.S. Patent Publication Number 20080009364, discloses a method of bonding a club head by brazing, wherein the components are provided with a metal skin layer on predetermined bonding portions prior to brazing.

Titanium brazing is done in a vacuum furnace under hard vacuum or partial pressure. Steel brazing can be done in air with flux or in a vacuum furnace under hard vacuum or partial pressure. Joining titanium and steel is difficult because they cannot form a strong bond under typical processes such as welding. Brazing offers a solution to join these dissimilar materials, but the typical material used for this process is silver, which is very expensive. Therefore, there remains a need for an efficient and cost-effective method of joining titanium components to steel components.

BRIEF SUMMARY OF THE INVENTION

This invention aims to identify a more efficient brazing joint for brazing a thin component onto a club head which also offers improved strength of the joint system (brazing area and surrounding geometry) especially in highly stressed regions during golf ball impact. Specifically, the following issues are addressed: complexity of the joint, cost, size of the joint and thus implementing it in smaller cross-sectional regions of the club head, and last but certainly not the least, the durability of the final part. An added bonus is that this new joint is also self-centering, further reducing the complexity of fitment.

The present invention is a method of joining two golf club components using a brazing material composed of a nickel based material and/or a copper based material.

One aspect of the present invention is a method for joining golf club head components. The method includes applying a nickel-based filler material to an attachment surface of a first component of the golf club head composed of a first material to create a nickel-based filler material attachment surface of the first component of the golf club head. The method also includes applying the nickel-based filler material to an attachment surface of a second component of the golf club head composed of a second material to create a nickel-based filler material attachment surface of the second component of the golf club head, wherein the second material is different from the first material. The method also includes fixturing, within a vacuum brazing furnace, the nickel-based filler material attachment surface of the first golf club component to face the nickel-based filler material attachment surface of the second golf club component. The method also includes performing at least one brazing cycle within the vacuum brazing furnace to braze the first component to the second component.

Another aspect of the present invention is a method for joining golf club head components. The method includes applying a copper-based filler material to an attachment surface of a first component of the golf club head composed of a first material to create a copper-based filler material attachment surface of the first component of the golf club head. The method also includes applying the copper-based filler material to an attachment surface of a second component of the golf club head composed of a second material to create a copper-based filler material attachment surface of the second component of the golf club head, wherein the second material is different from the first material. The method also includes fixturing, within a vacuum brazing furnace, the nickel-based filler material attachment surface of the first golf club component to face the nickel-based filler material attachment surface of the second golf club component. The method also includes performing at least one brazing cycle within the vacuum brazing furnace to braze the first component to the second component.

Yet another aspect of the present invention is a method comprising a first step of providing a first golf club component composed of a first material, the first golf club component comprising a first attachment surface, a second step of providing a second golf club component composed of a second material that differs from the first material, the second golf club component comprising a second attachment surface, a third step of preparing each of the first and second attachment surface for brazing, a fourth step of applying to at least one of the first and second attachment surfaces a nickel-based filler, a fifth step of fixturing each of the first and second golf club components within a vacuum brazing furnace so that the first and second attachment surfaces face one another, and a sixth step of performing at least one brazing cycle within the vacuum brazing furnace.

In some embodiments, the first material may be selected from the group consisting of titanium and titanium alloy. In a further embodiment, the method may further comprise the step of wetting the first attachment surface, and the step of wetting the first attachment surface may occur between the third step and the fourth step. In another embodiment, the second material may be a steel material. In any of the embodiments, the nickel-based filler may be BNi-2, BNi-7, or BNi-9. In any of the embodiments, the first component may be a face component composed of a titanium alloy and the second component may be a body component composed of a steel material. In some embodiments, the face component may be a wood-type golf club face component and the body component may be a wood-type golf club body component. In other embodiments, the face component may be an iron-type golf club face component and the body component may be an iron-type golf club body component.

In still other embodiments, third step may comprise cleaning the first and second attachment surfaces. In any of the embodiments, the sixth step may comprise a short brazing cycle. In some embodiments, the first component may be a weight composed of a tungsten alloy material, and the second component may be a body component composed of a steel material. In a further embodiment, the nickel-based filler may be selected from the group consisting of BNi-2, BNi-7, and BNi-9. In other embodiments, the steel material may be a stainless steel. In still other embodiments, the body component may be selected from the group consisting of an iron-type golf club body and a wood-type golf club body.

Yet another aspect of the present invention is a golf club head comprising a body having an internal edge defining a recess, and a face component having an internal edge. The face component is disposed over the recess. A miter joint between the face component and the body has an angle ranging from about 1 degree to about 89 degrees relative to a plane of a front wall of the face component.

Yet another aspect of the present invention is a golf club head comprising a body having an internal edge defining a recess, and a face component having an internal edge. The face component is disposed over the recess. The internal edge of the body and the internal edge of the face have an angle ranging from about 1 degree to about 89 degrees.

Yet another aspect of the present invention is a method for manufacturing a golf club head. The method includes preparing a body comprising a first metal material. The method also includes preparing a face component comprising a second metal material. The method also includes brazing the body to the face component along a miter joint between the face component and the body that has an angle ranging from 10 degrees to 45 degrees relative to a plane of a front wall of the face component.

Yet another aspect of the present invention is an iron-type golf club head comprising a body and a face component. The iron-type body has an internal edge defining a recess. The body also comprises a first attachment surface formed continuously around an entire perimeter portion of the body. The body is composed of a steel material. The single material face component has a second attachment surface. The face component is disposed over the recess. An area of the recess is substantially the same as an area of the face component. The face component is composed of a titanium alloy material. A brazing material joins the first attachment surface and the second attachment surface. A miter joint is formed between the second attachment surface of the face insert and the first attachment surface of the body and has an angle ranging from 10 degrees to 80 degrees relative to a plane of a rear surface of the face component. The second attachment surface of the face component is formed continuously around an entire circumference of the rear surface of the face component and is attached atop the first attachment surface of the body. The second attachment surface of the face component has a width ranging from 0.04 inch to 0.5 inch and the first attachment surface of the body has a width substantially matching the width of the second attachment surface of the face component.

Yet another aspect of the present invention is an iron-type golf club head comprising a body and a face insert. The iron-type body has an internal edge defining a recess. The body also comprises a first attachment surface formed continuously around an entire perimeter portion of the body. The body is composed of a steel material. The first attachment surface comprises a first section, a second section and at least one transition section. The single material face insert has a second attachment surface. The face insert is disposed over the recess. An area of the recess is substantially the same as an area of the face insert. The face insert is composed of a titanium alloy material. The second attachment surface comprises a first section, a second section and at least one transition section corresponding to the first section, the second section and the at least one transition section of the first attachment surface. A brazing material joins the first attachment surface and the second attachment surface. A miter joint is formed between the second attachment surface of the face insert and the first attachment surface of the body and has an angle ranging from 10 degrees to 80 degrees relative to a plane of a rear surface of the face insert. A first angle of the first section of the first attachment surface and the first section of the second attachment surface has an angle greater than a second angle of the second section of the first attachment surface and the second section of the second attachment surface. The at least one transition section has a third angle with a value between the first angle and the second angle.

Having briefly described the present invention, the above and further objects, features, and advantages thereof will be recognized by those skilled in the pertinent art from the following detailed description of the invention when taken in conjunction with the accompanying drawings.

DETAILED DESCRIPTION OF THE INVENTION

Figure 1:
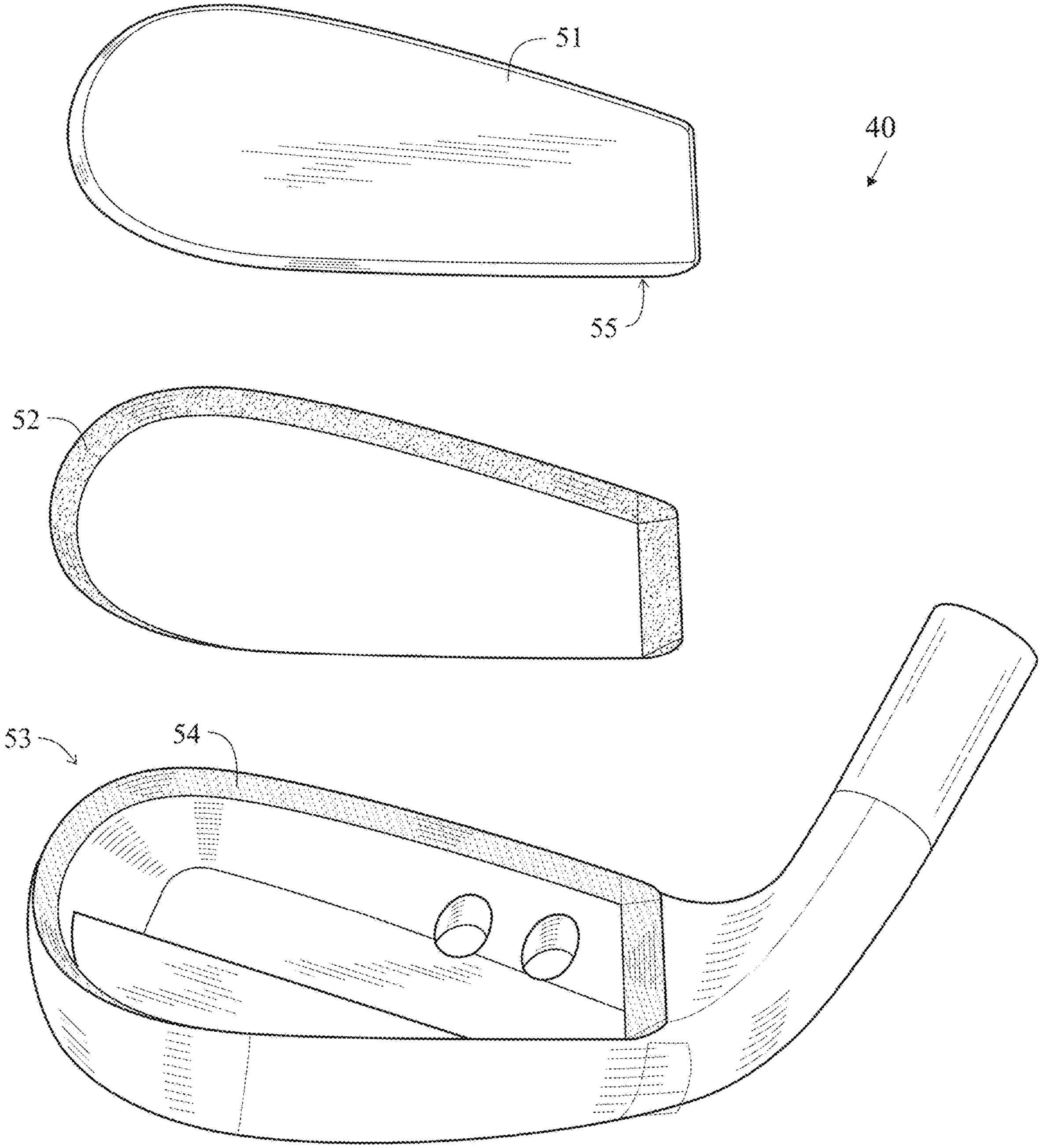
FIG. 1 is an exploded image of a first embodiment of a golf club head with components joined by brazing.

In this invention, the miter joint is adapted, a joint type currently used in the construction industry for wood framing products, for use in a golf club head as a brazing joint for joining two components composed of dissimilar materials. Specifically in support of this invention, this joint is used to attach a thin, large-area component to a golf club body—for example, a titanium face plate to an iron steel body.

A significant improvement in a durability joint system is achieved, especially in the topline region of an iron, where the incentive is to reduce weight and cross-sectional area as much as possible for performance benefits. As a result of its smaller width requirements, the miter joint is preferably around the entire perimeter of the golf club component, that is, a full 360 degree joint. Machining complexity is brought to a minimum while retaining the necessary accuracy of fit and gap size for proper flow of brazing material.

Specifically in this implementation, the best benefits are achieved with a miter joint preferably between ten degrees and forty degrees, more preferably between twenty-five degrees and thirty-five degrees, and more preferably 30 degrees relative to an edge of the opening for a golf club head body, and the miter joint is relative to an edge of an interior surface of a face insert. The miter joint preferably has a width ranging from 0.04 inch to 0.5 inch, more preferably from 0.1 to 0.5 inch or 0.04 to 0.350 inch, even more preferably from 0.125 inch to 0.375 inch, and most preferably 0.25 inch.

In one preferred embodiment, a miter joint having an angle ranging from about 1 to about 89 degrees is used for brazing a titanium face plate to a steel iron body.

In another preferred embodiment, a miter joint having an angle ranging from about 10 to about 45 degrees is used for brazing a titanium face plate to a steel iron body.

In another preferred embodiment, a miter joint having an angle ranging from about 1 to about 10 degrees; or about 45 to about 89 degrees is used for brazing a titanium face plate to a steel iron body.

In another preferred embodiment, a miter joint having an angle ranging from about 10 to about 60 degrees is used for brazing a titanium face plate to a steel iron body.

In another preferred embodiment, a miter joint having an angle ranging from about 1 to about 10 degrees is used for brazing a titanium face plate to a steel iron body.

In another preferred embodiment, a miter joint having an angle ranging from about 45 to about 89 degrees is used for brazing a titanium face plate to a steel iron body.

Combinations of dissimilar metal materials include, for example, stainless steel to titanium, steel to titanium, stainless steel to aluminum, steel to aluminum, aluminum to titanium, tungsten to titanium, tungsten to stainless steel, and tungsten to steel. In these combinations, the stainless steel may be 17-4, 304, 304L, 321, 303, 316, 316L, 420, 425, 425M, 450, 455, 475, or HSR300; the aluminum may be 6061, 6063, or 7075; the titanium may be 6-4, 811, FS2S, FS2S+, SP700, Ti 17, Ti 21, 15-3-3-3; the steel may be C300 maraging steel, 1020, 1025, 1045, 4130, 4140, 4340; and the tungsten may have a density of 10 g/cc to 18 g/cc.

Although the present invention has been described in connection with an iron-type golf cub head, those skilled in the pertinent art will recognize that the miter joint may be applied to woods and putters without departing from the scope of the present invention.

Figure 6:
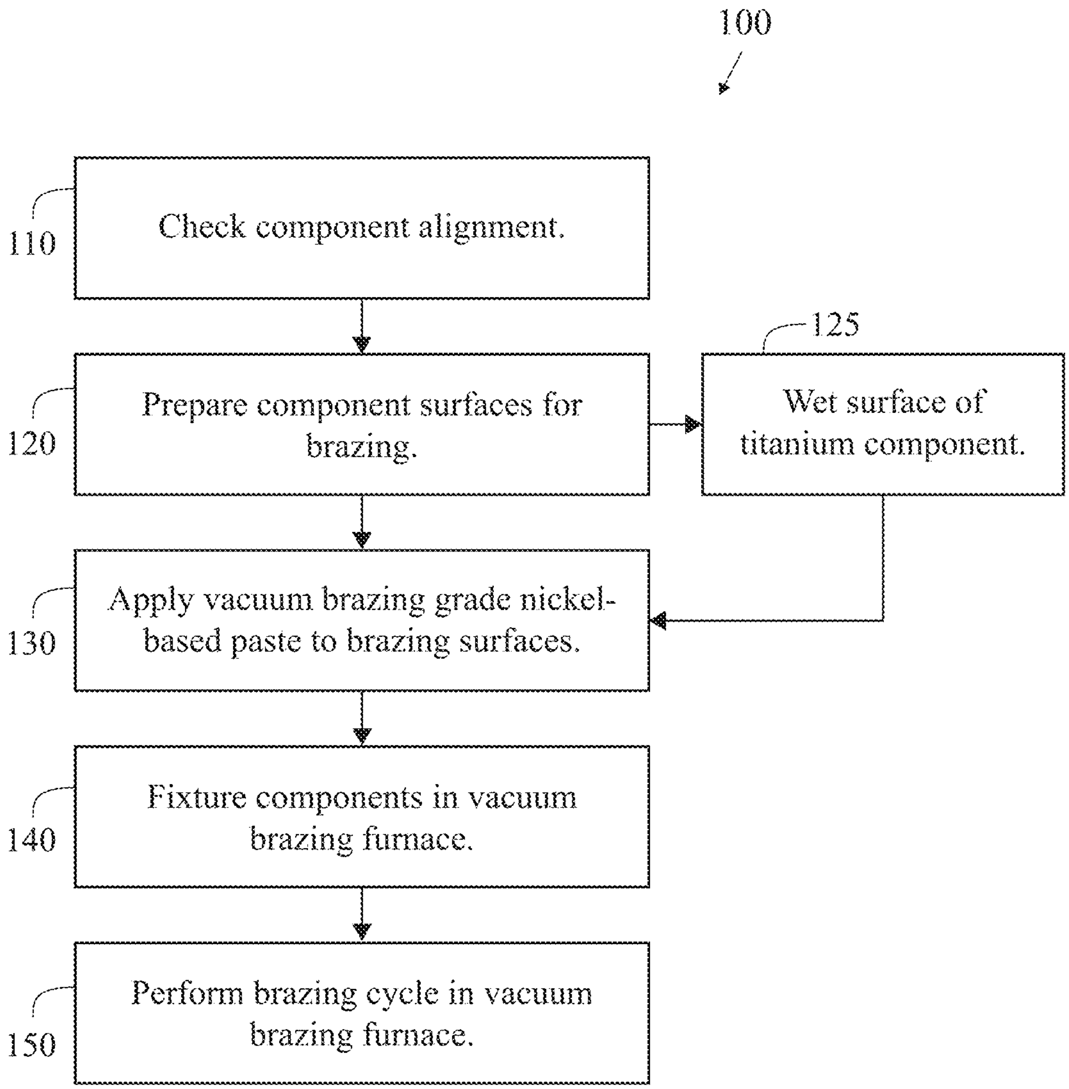
FIG. 6 is a process flow chart illustrating a method for joining golf club head components.

A flow chart of a method 100 for joining golf club components through brazing is shown in FIG. 6. In a first step 110, components 51, 53 made of dissimilar materials, such as titanium alloys and steel alloys, are aligned to ensure proper connectivity. In a second step 120, the components 51, 53 are prepared for brazing, preferably by cleaning their surfaces 55, 54 and removing oxide layers by blasting, wire brush, or any means known to a person skilled in the art. In a third step 130, a brazing material, preferably a nickel-based filler 52 such as BNi-2, BNi-7, or BNi-9, is applied to at least one of the surfaces 55, 54 of the components. The nickel-based filler 52 does not have any low vaporization elements, so a hard vacuum can be used to conduct brazing, and nickel is about 20% of the price of silver so it is much more cost effective for use in manufacturing. Nickel is soluble into titanium, so the surface of the titanium component 51 may be wetted in an intermediate step 125 between the second and third steps 120, 130. Nickel-based fillers 52 can also be used for steel and stainless-steel brazing. In a fourth step 140, the components 51, 53 are fixtured within a vacuum brazing furnace, and in a fifth step 150 a brazing cycle is performed to permanently affix the components together. It is preferable for the brazing cycle to be short so that the materials are heated and cooled quickly, thereby causing less beta phase to form on titanium (particularly 6-4) components.

In an alternative embodiment, the brazing material is a copper-based filler selected from the group consisting of copper and a copper alloy (67.5% Cu/23.5% Mn/9% Ni) composed of copper, manganese and nickel. The copper-based filler is preferably used for brazing a titanium face plate 51 to a steel iron body 53.

An exemplary golf club head 40 made up of components 51, 53 made of dissimilar materials and assembled using the method described above is illustrated in FIG. 1. In this embodiment, the body component 53 is composed of a steel material and the face component 51 is composed of a titanium alloy material, preferably 6-4 titanium. Steel, when described herein, may include all steel variants, including stainless steel. Titanium, when described herein, may refer to pure titanium and titanium alloy may refer to all titanium alloys known to a person of ordinary skill in the art.

In another embodiment of the present invention, a golf club is assembled using the preferred method 100 described above. In this embodiment, the component 51 is a tungsten or tungsten alloy weight piece that is affixed as described above to the body 53 of a golf club head 40.

Figure 2:
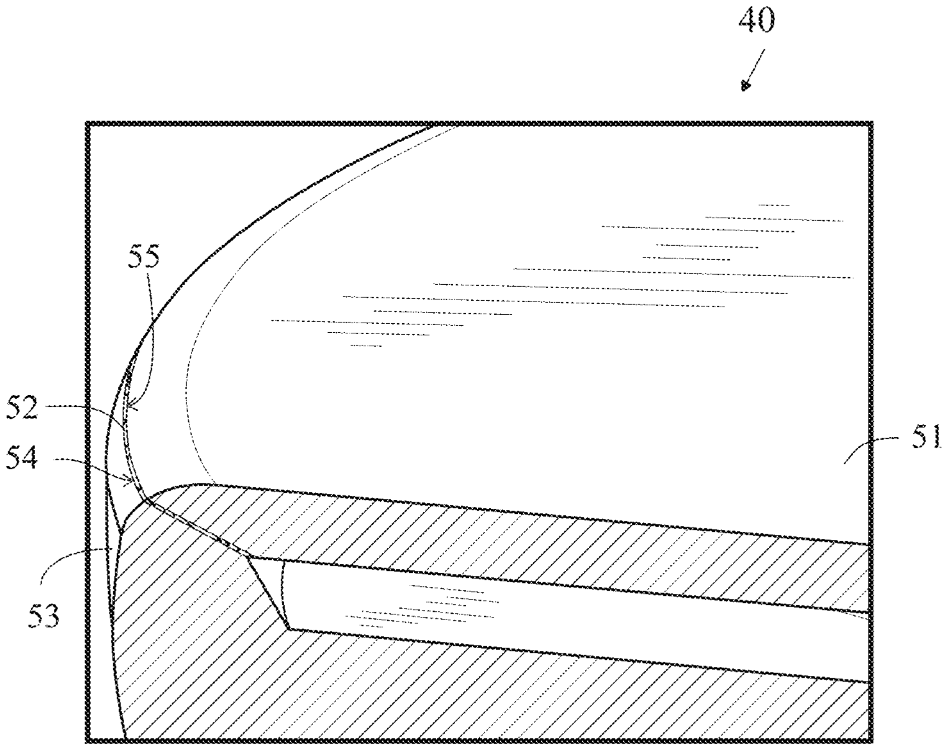
FIG. 2 is a cross-sectional view of an iron-type golf club head with parts joined by brazing.
Figure 3:
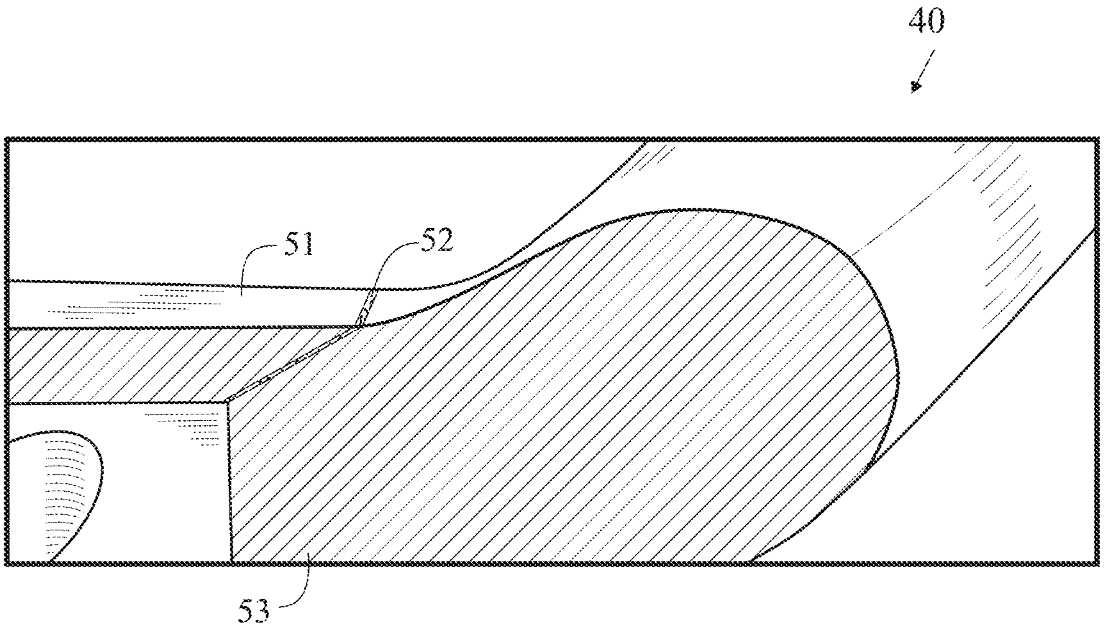
FIG. 3 is a cross-sectional view of an iron-type golf club head with parts joined by brazing.
Figure 4:
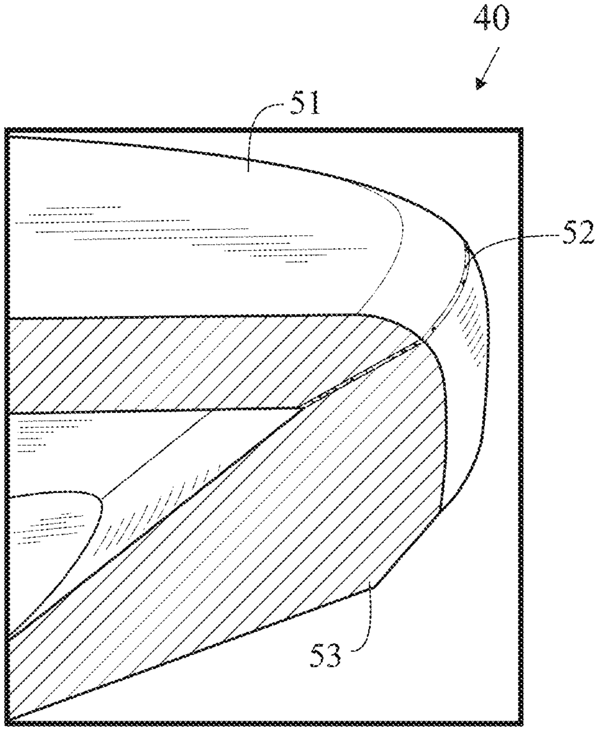
FIG. 4 is a cross-sectional view of an iron-type golf club head with parts joined by brazing.

As shown in FIG. 1, an iron-type golf club head 40 has a first component 51 a brazing material 52 and a second component 53. In this embodiment, the first component 51 is a face insert and the second component 53 is a body of the iron-type golf club head. The second component 53 has an attachment surface 54 and the first component 51 has an attachment surface 55, which in this embodiment is an internal surface of the face insert. The attachment surface is the mitered joint discussed above, preferably having an angle of between ten degrees and forty degrees, more preferably between twenty-five degrees and thirty-five degrees, and more preferably 30 degrees relative to an edge of the opening for a golf club head body. The brazing material 52, in a paste form, is applied to one the attachment surfaces 54. The first component 51 is fixtured within a vacuum brazing furnace, with the attachment surface 55 of the first golf club component 51 facing the brazed material coated attachment surface 54 of the second golf club component 53. A brazing cycle within the vacuum brazing furnace is performed to braze the first component to the second component to form an iron type golf club head as shown in FIGS. 2-4.

Figure 5:
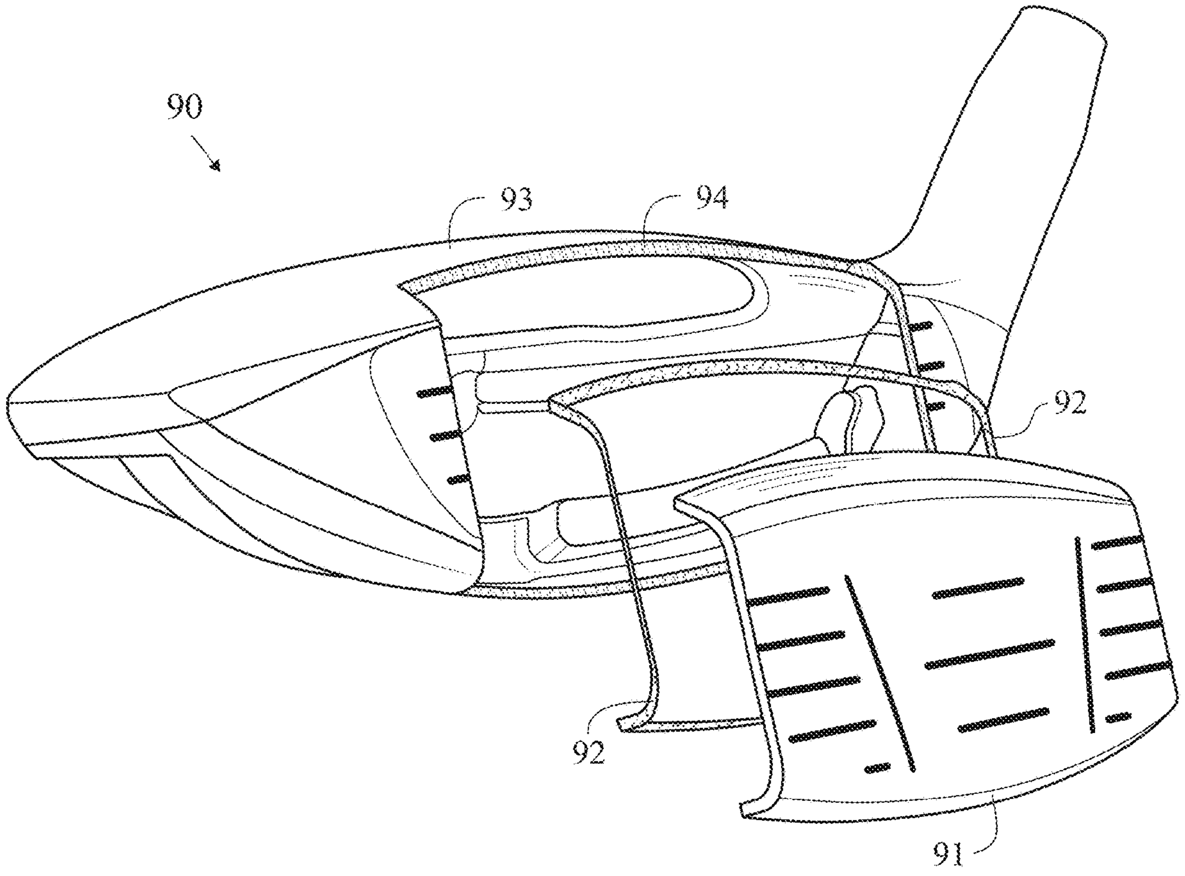
FIG. 5 is an exploded view of a wood-type golf club head having components joined by brazing.

As shown in FIG. 5, a wood golf club head 90 has a first component 91 a brazing material 92 and a second component 93. In this embodiment, the first component 91 is a face insert and the second component 93 is a body of the wood-type golf club head 90. The second component 93 has an attachment surface 94 (a perimeter around an opening in the body) and the first component 91 has an attachment surface (not shown), which in this embodiment is an internal surface of the face insert. The brazing material 92, in a paste form, is applied to one of the attachment surfaces 94. The first component 91 is fixtured within a vacuum brazing furnace, with the attachment surface of the first golf club component 91 facing the brazed material coated attachment surface 94 of the second golf club component 93. A brazing cycle within the vacuum brazing furnace is performed to braze the first component to the second component to form an wood-type golf club head.

In a preferred embodiment 5-8 grams, and more preferably 5.5 to 7 grams of the brazing material paste is applied to a surface of the first component or second component to ensure a proper fill. Excess paste is preferably utilized to create a "bead" on the outside of the part that ground away to reveal a final joint (joining of the two components). In a preferred embodiment, 2.5 to 4 grams remain in the part after braze bead removal. A most preferred theoretical mass is only 0.6-0.8 grams of brazing material remaining in the part.

An alternative brazing material is a silver-based brazing material. The silver-based brazing material preferably comprises silver, copper, titanium and other elements. Pure silver has a vaporization temperature of 4013° F. at ambient pressure, and a vaporization temperature of 1558° F. at a pressure of $10^{-4}$ Torr.

Ambient pressure is approximately 760 Torr. A low vacuum has a pressure ranging 760-25 Torr. A medium vacuum has a pressure ranging from 25 to $10^{-3}$ Torr. A high vacuum has a pressure ranging from $10^{-3}$ to $10^{-9}$ Torr. In a preferred embodiment, during a brazing cycle within a vacuum brazing furnace, a reducing environment is created by generating a high vacuum preferably ranging from $10^{-3}$ Torr to $10^{-5}$ Torr. The reducing environment is created to reduce any oxides created by heating the brazing material applied to the golf club components since the brazing material is heated to just under its vaporization temperature.

In one embodiment, the first component is a wood-type golf club face component and the second component is a wood-type golf club body component. The wood-type golf club head has a volume ranging from 200 cubic centimeters to 475 cubic centimeters.

In another embodiment, the first component is an iron-type golf club face component and the second component is an iron-type golf club body component.

In another embodiment, the first component is a face component composed of a titanium alloy, and the second component is a body component composed of a steel material.

Figure 7:
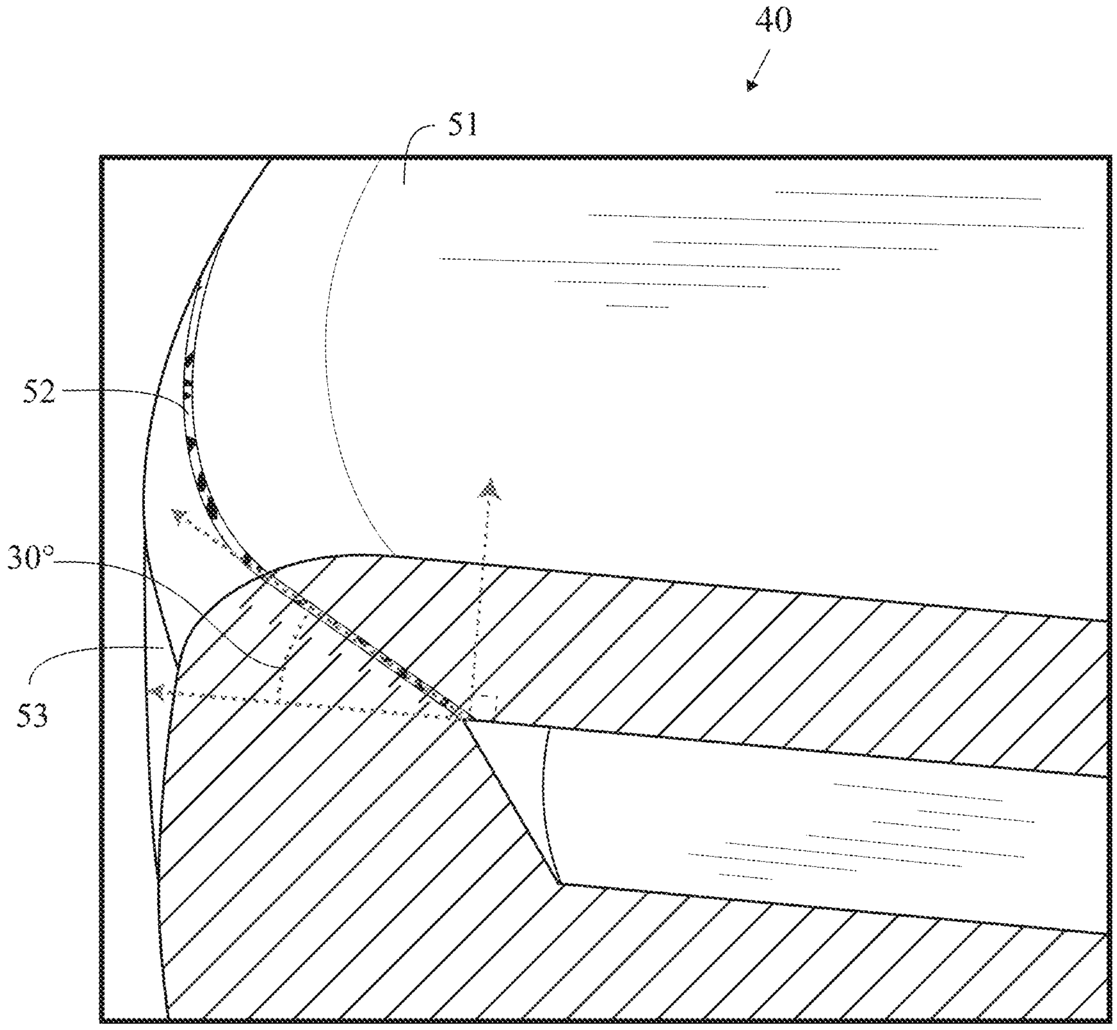
FIG. 7 illustrates a cross-sectional view of an iron-type golf club head with parts joined by brazing.

FIG. 7 illustrates a cross-sectional view of an iron-type golf club head with parts joined by brazing. The golf club head 40 has a face insert 51 preferably composed of a titanium alloy material and a body 53 preferably composed of an iron-alloy material. A filler material 52 is used to join the two different material components 51 and 53 together. The face insert 51 and body 53 are joined at a miter joint, which has an angle relative to an internal surface of the face insert 51 of preferably 10 degrees to 80 degrees, more preferably 25 degrees to 65 degrees, and most preferably 30 degrees to 60 degrees.

Figure 8:
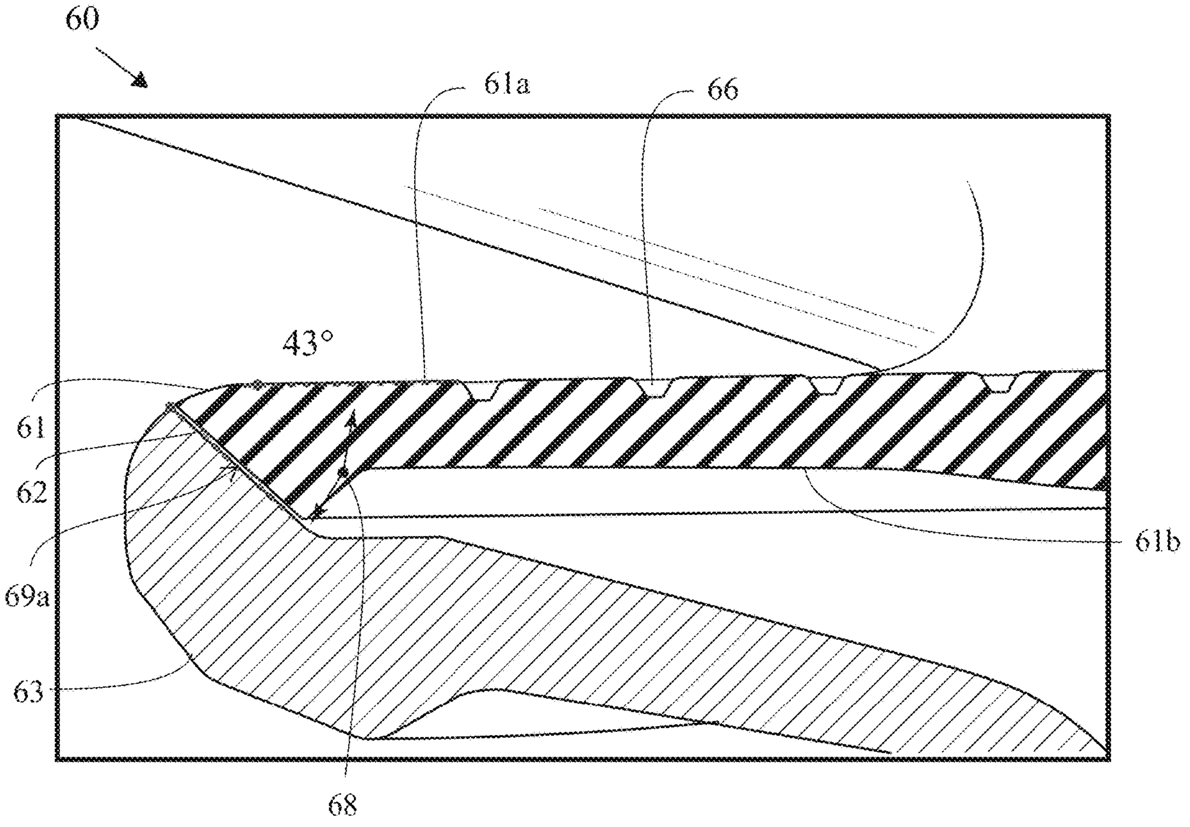
FIG. 8 illustrates an isolated cross-sectional view of a long iron-type golf club head (1-iron to 7-iron) showing a 43 degree angle miter joint.
Figure 9:
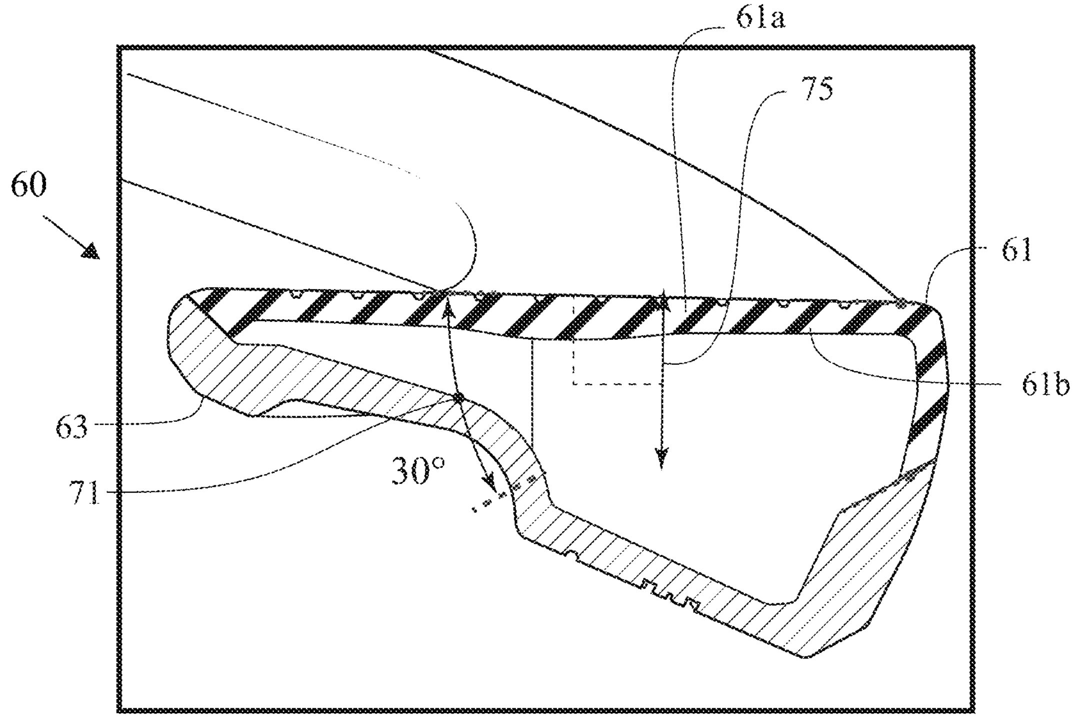
FIG. 9 illustrates an isolated cross-sectional view of a long iron-type golf club head (1-iron to 7-iron) with a return flange showing a 30 degree from an impact surface tangency and miter joint.
Figure 10:
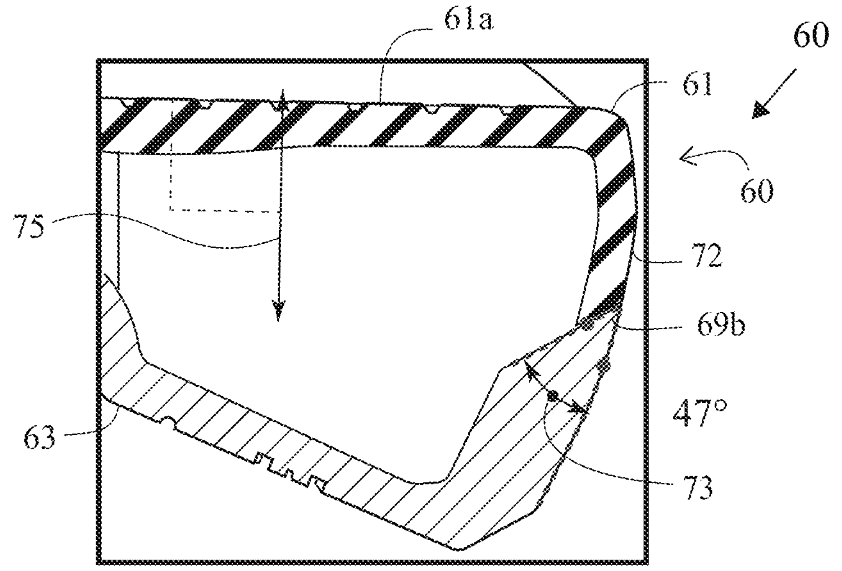
FIG. 10 illustrates an isolated cross-sectional view of a long iron-type golf club head (1-iron to 7-iron) with a return flange showing a 47 degree from an external surface tangent and miter joint.

FIGS. 8-10 illustrate a cross-sectional view of a long iron-type golf club head (1-iron to 7-iron) 60. The golf club head 60 has a face insert 61 composed of a titanium alloy and a body 63 composed of an iron alloy material. The face insert has an external surface 61*a* and an internal surface 61*b*. The external surface 61*a* preferably has grooves 66. A filler material 62 is used to join the face insert 61 to the body 63 at a miter joint 69*a*. FIG. 8 shows an angle 68 between an external surface 61*a* of the face insert and the miter joint 69*a*. The measurement is taken at a face center. The angle 68 preferably ranges from 10 degrees to 75 degrees, more preferably from 25 degrees to 65 degrees, even more preferably from 30 degrees to 60 degrees, and is most preferably 43 degrees.

In FIG. 9, the long iron-type golf club head 60 with a return flange showing a 30 degree angle 71 from an impact surface tangency and the miter joint 69*a*. Line 75 represents a line normal to the external surface 61*a* of the face insert 61.

In FIG. 10, the long iron-type golf club head 60 has a face insert 61 with a return portion 72. The return portion 72 of the face insert 61 is joined to the body 63 at a miter joint 69*b*. The angle 73 preferably ranges from 10 degrees to 80 degrees, more preferably from 25 degrees to 65 degrees, even more preferably from 30 degrees to 60 degrees, and is most preferably 47 degrees. The angle 73 is from an external surface tangent and the miter joint 69*b*.

Figure 11A:
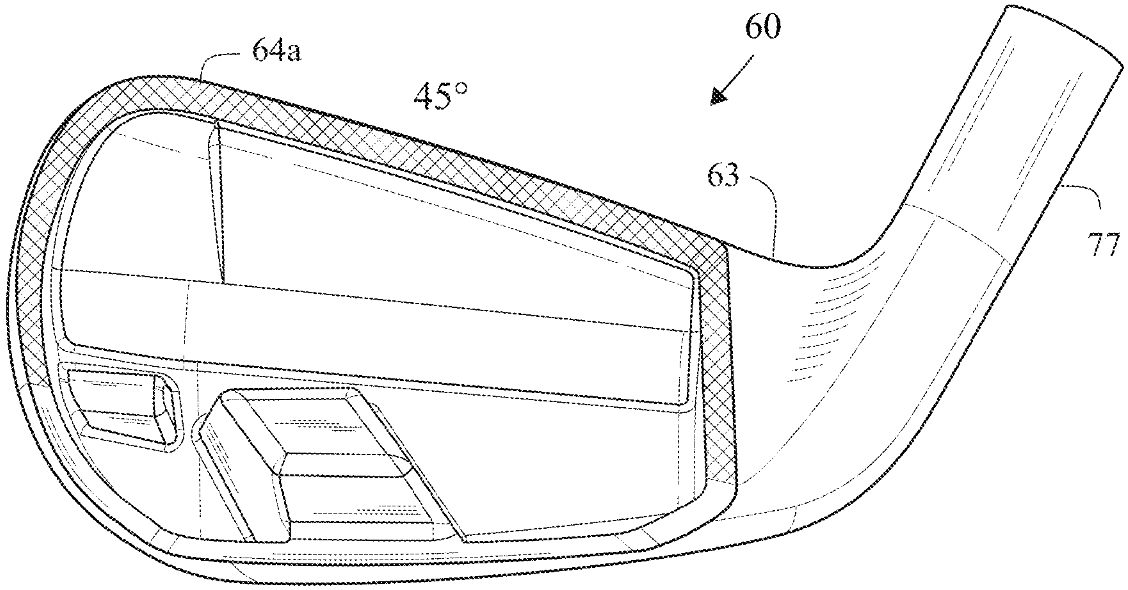
FIG. 11A is a cut-away view of a long iron-type golf club head (1-iron to 7-iron) showing a first section of an attachment surface of a body for a miter joint having a 45 degree angle.
Figure 11B:
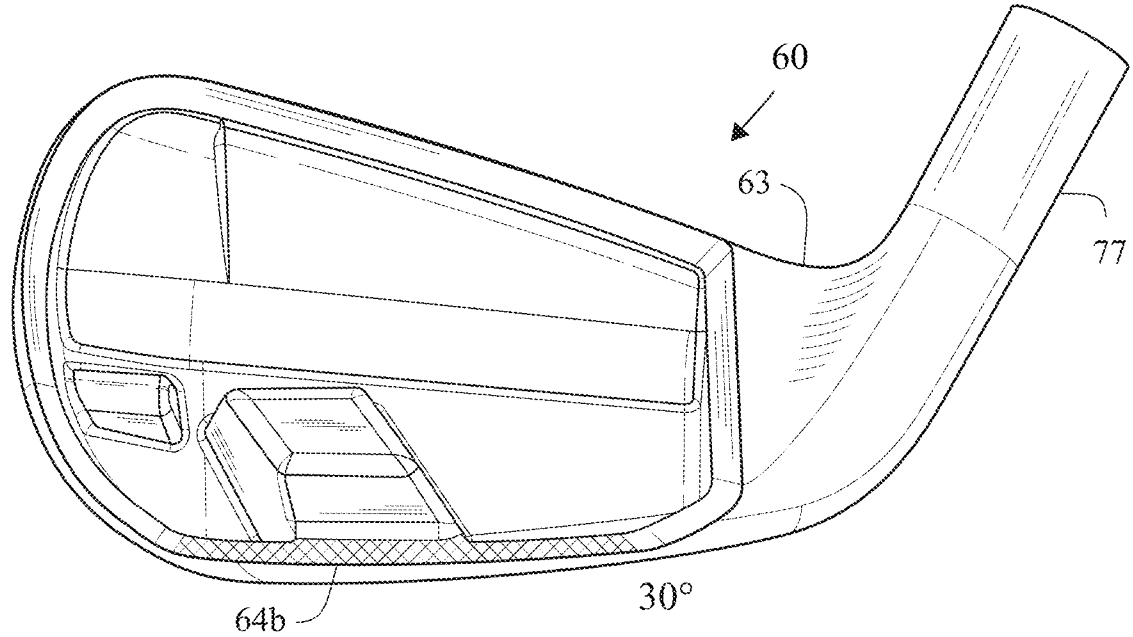
FIG. 11B is a cut-away view of a long iron-type golf club head (1-iron to 7-iron) showing a second section of an attachment surface of a body for a miter joint having a 30 degree angle.
Figure 11C:
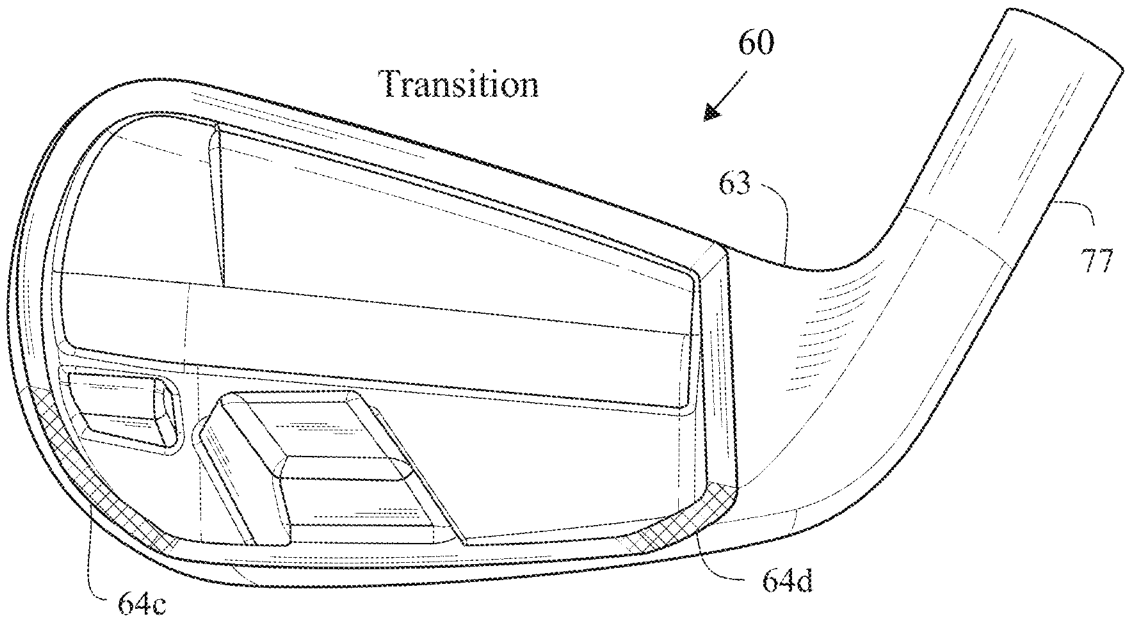
FIG. 11C is a cut-away view of a long iron-type golf club head (1-iron to 7-iron) showing transition sections of an attachment surface of a body for a miter joint.

FIGS. 11A-11C illustrate an alternative embodiment of a cut-away view of a body 63 of a long iron-type golf club head 60 showing multiple sections of the attachment surface with different miter joint angles. In FIG. 11A, a first section 64*a* of an attachment surface of the body 63 has an angle of 45 degrees. In FIG. 11B, a second section 64*b* of the attachment surface of the body 63 has an angle of 30 degrees. In FIG. 11C, transition sections 64*c* and 64*d* of the attachment surface of the body 63 have angles that transition between the angles of the first attachment surface 64*a* and the second attachment surface 64*b*. Each attachment surface 64*a*, 64*b*, 64*c* and 64*d* may have an angle relative to an internal surface of the face insert 51 of preferably 10 degrees to 80 degrees, more preferably 25 degrees to 65 degrees, and most preferably 30 degrees to 60 degrees. Further, the number of attachment surfaces with different angles preferably may vary from 20 to 2, 10 to 4 and most preferably 4.

Figure 12:
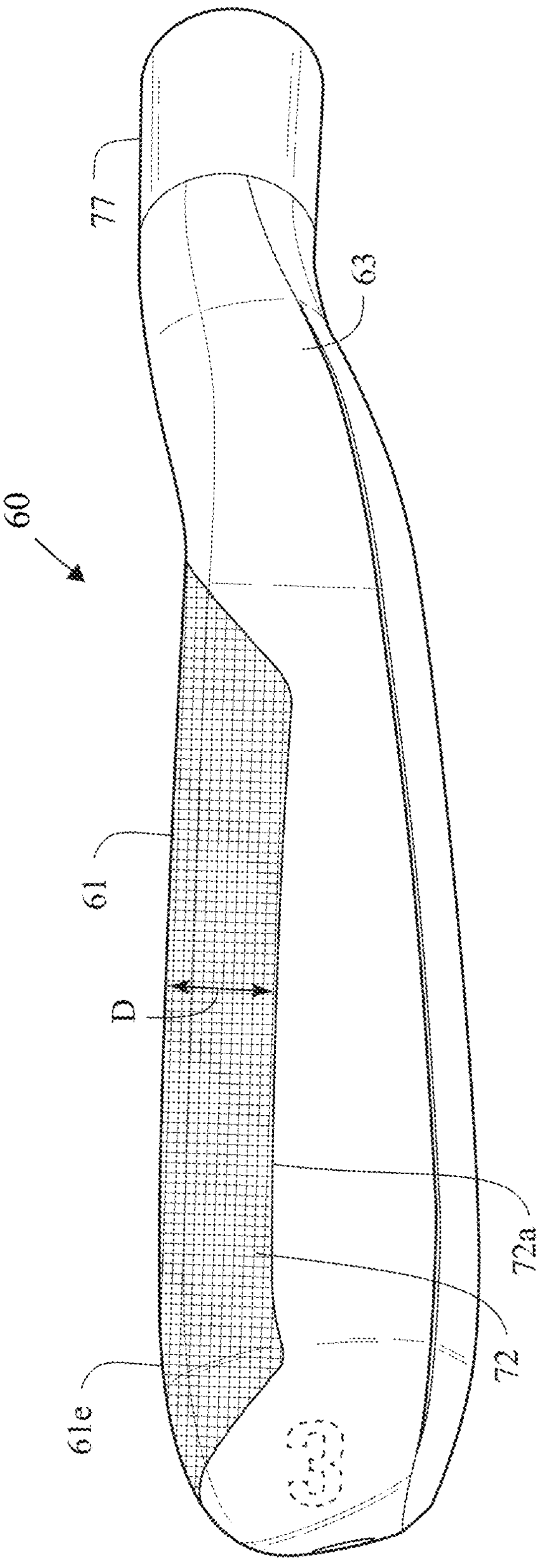
FIG. 12 is a bottom plan view of a long iron-type golf club head (1-iron to 7-iron) showing a return portion of a face insert.
Figure 13:
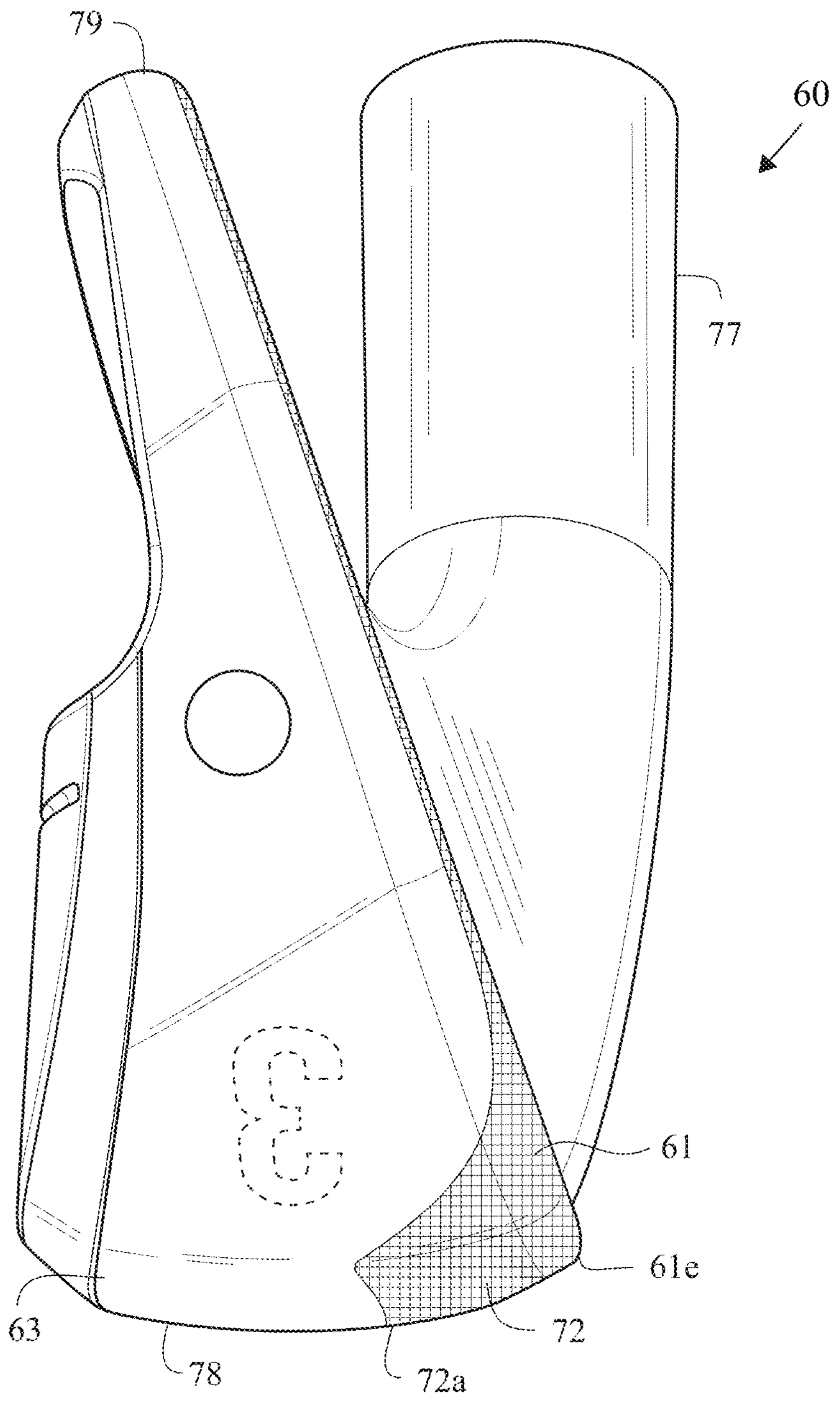
FIG. 13 is a toe-side elevation view of a long iron-type golf club head (1-iron to 7-iron) showing a return portion of a face insert.

FIGS. 12 and 13 illustrate a return portion 72 of the face insert 61 of a long iron-type golf club head (3-iron to 7-iron) 60. The return portion extends from a front edge 61*e* to a back edge 72*a*. The return portion 72 preferably has a distance D that ranges from preferably less than half of a length of a sole section 78 of the golf club head 60 to less than one quarter of the length of the sole section 78. Depending on the length of the sole section 78, the return portion has a length ranging from 0.1 to 0.7 inch, more preferably from 0.25 to 0.5 inch. In one embodiment, the return portion 72 has a distance that approximately matches a length of a crown section 79 of the golf club head 60.

Figure 14:
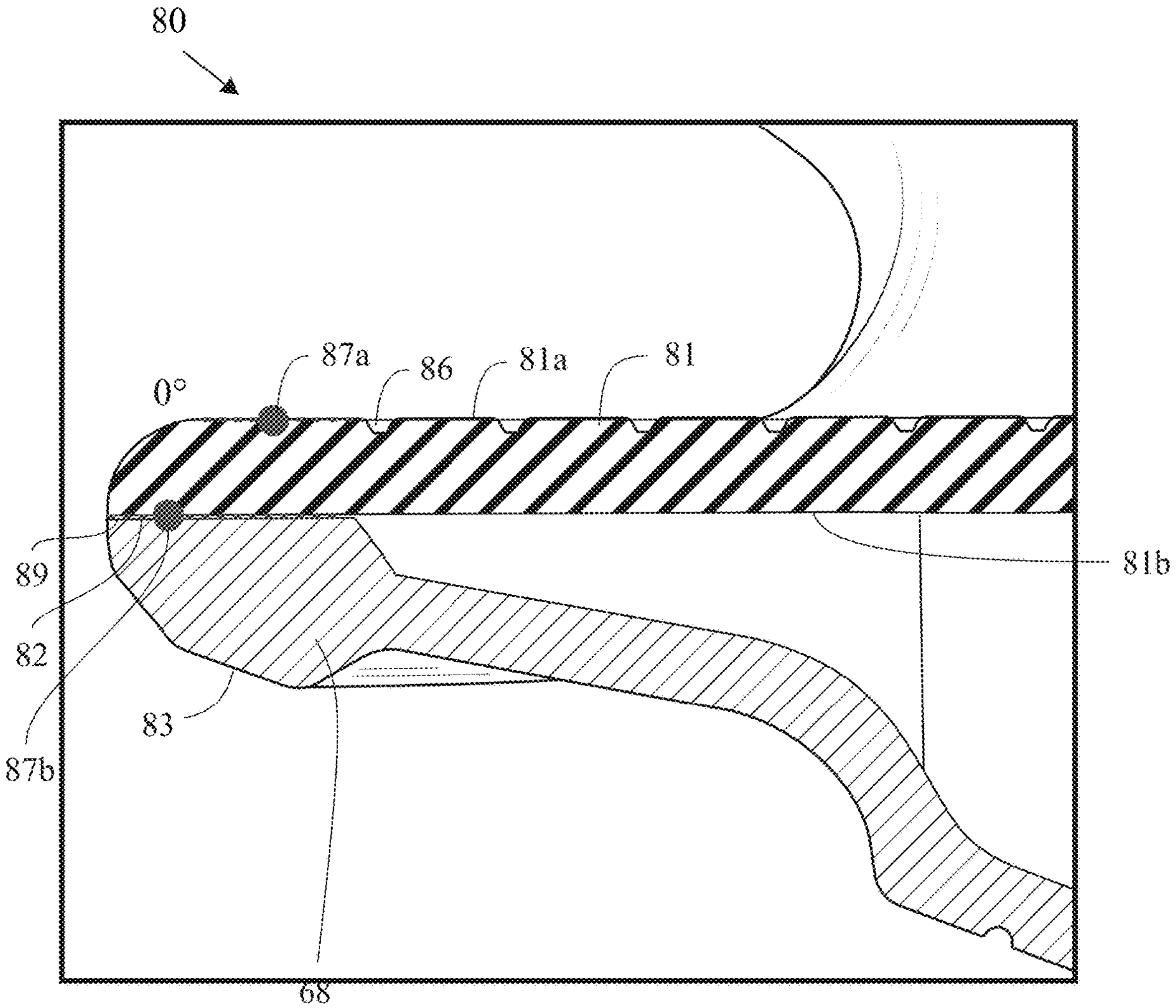
FIG. 14 illustrates an isolated cross-sectional view of a short iron-type golf club head (8-iron to sand wedge) showing a parallel joint.

FIG. 14 illustrates an isolated cross-sectional view of a short iron-type golf club head (8-iron to sand wedge) 80 showing a parallel joint. The iron-type golf club head has a face insert 81 and a body 83. The face insert 81 is joined to the body at a joint 89 using a filler material 82. The face insert 81 has an external surface 81*a* with grooves 86 and an internal surface 81*b*. Point 87*a* is parallel to point 87*b*. The joint 89 has an angle of zero or approximately zero. Alternatively, the joint 89 has an angle ranging from 1 to 10 degrees relative to a plane of a rear surface of the face insert 81.

Figure 15:
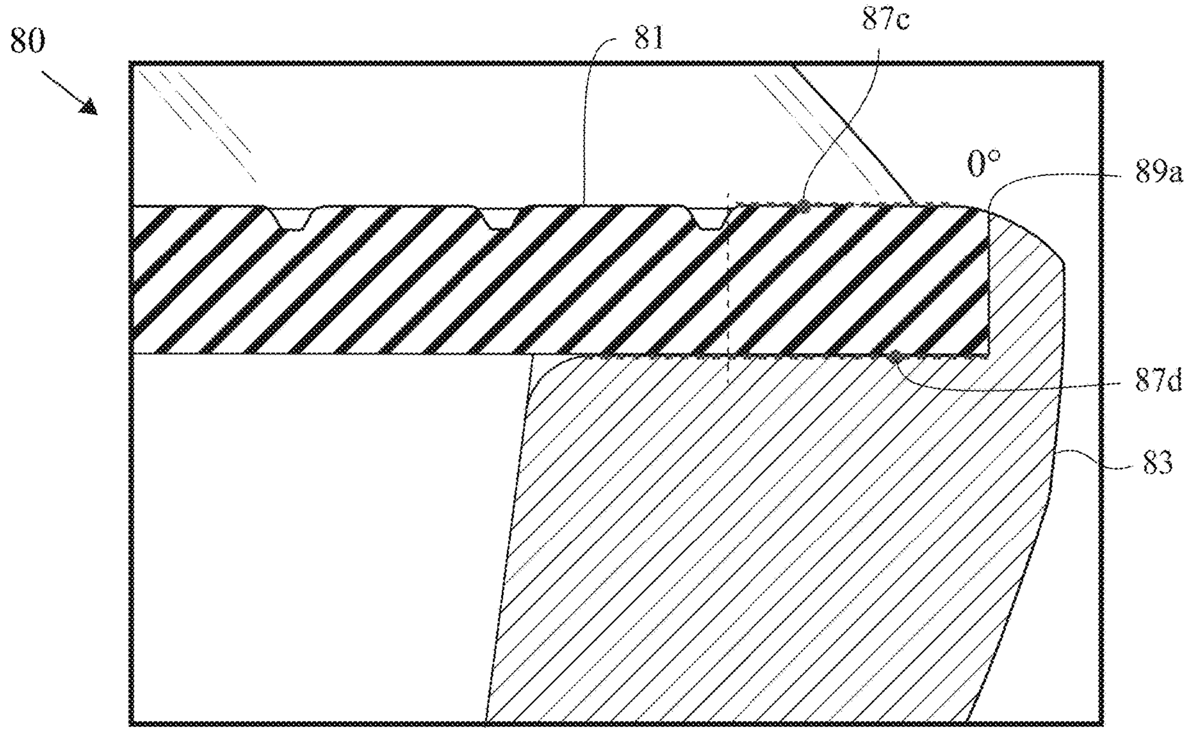
FIG. 15 illustrates an isolated cross-sectional view of a short iron-type golf club head (8-iron to sand wedge) showing a butt joint.
Figure 16:
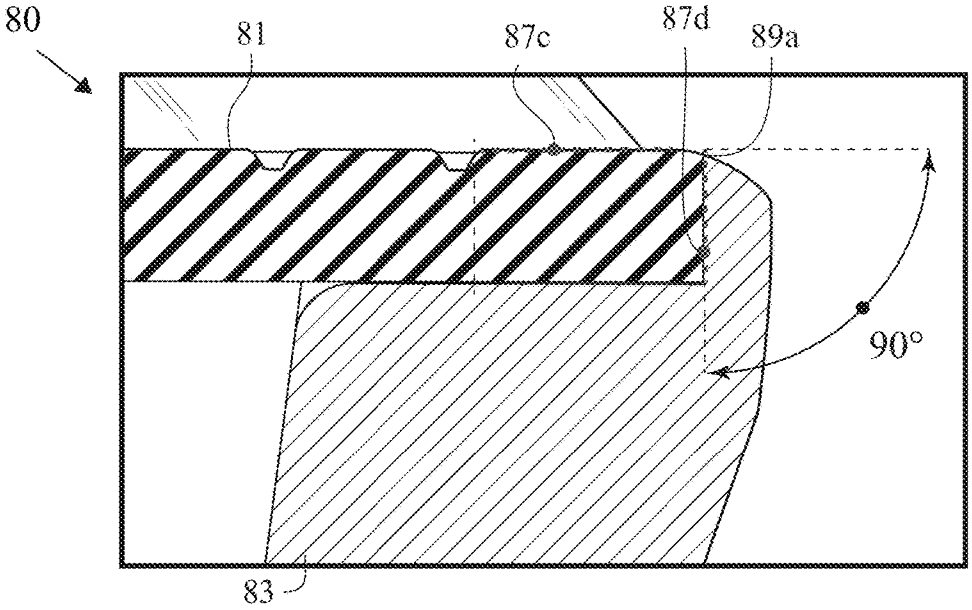
FIG. 16 illustrates an isolated cross-sectional view of a short iron-type golf club head (8-iron to sand wedge) showing a butt joint.

FIGS. 15 and 16 illustrate a short iron-type golf club head 80 with a butt joint 89*a*. Point 8*c* is at an angle of ninety degrees to point 82*d*.

Typical loft angles for irons are set forth in Table One.

TABLE ONE

| | |
|---|---|
| #1 | 15° |
| #2 | 18° |
| #3 | 21° |
| #4 | 24° |
| #5 | 27° |
| #6 | 30° |
| #7 | 34° |
| #8 | 38° |
| #9 | 42° |
| PW | 46° |
| AW | 50° |
| SW | 55° |
| LW | 60° |

Figure 17:
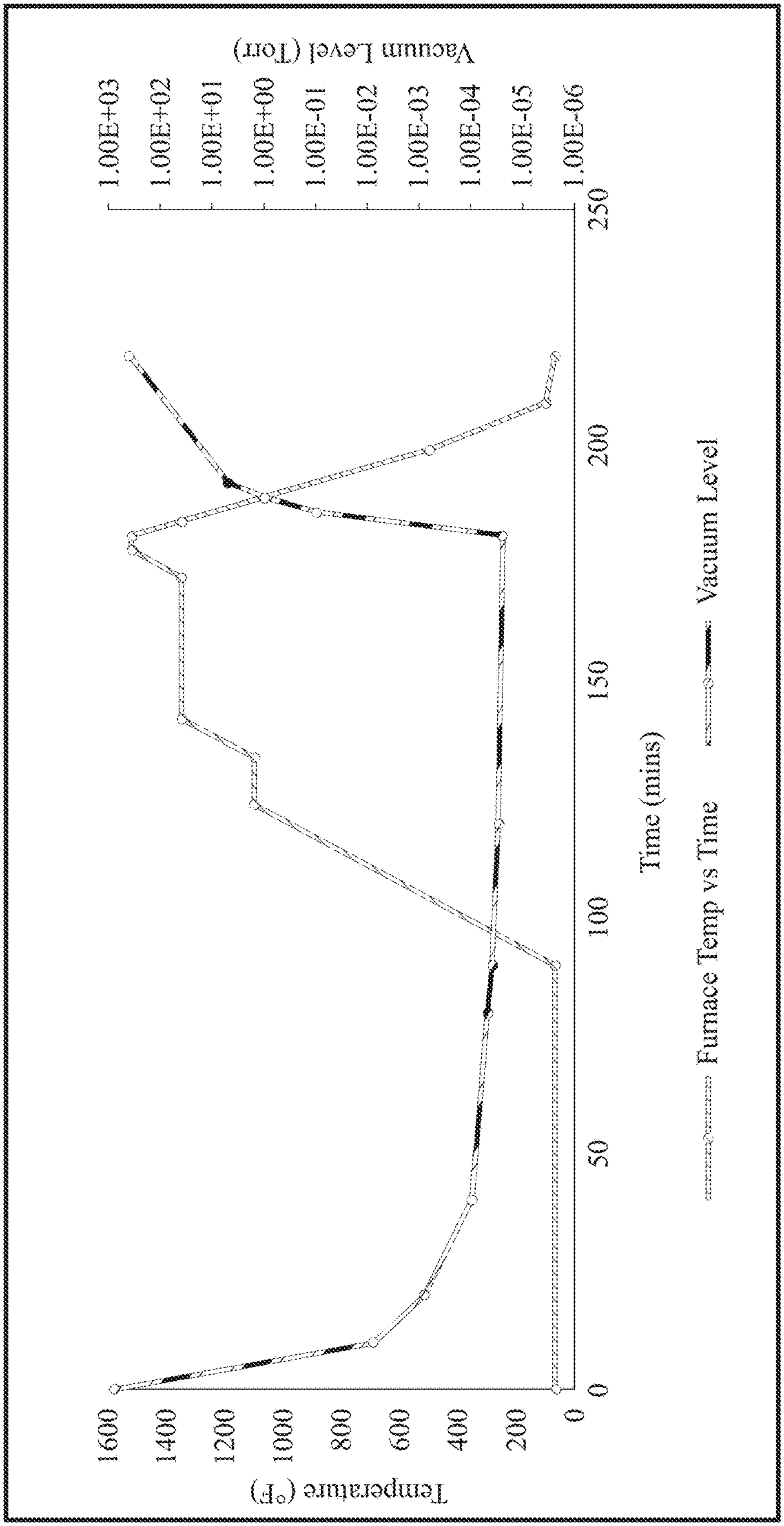
FIG. 17 is a graph time, temperature and vacuum pressure for a brazing cycle using a silver-based brazing material.

FIG. 17 is a graph 1000 of time, temperature and vacuum pressure for a brazing cycle within a vacuum brazing furnace to braze a first component of a golf club head to a second component of a golf club head using a silver-copper-titanium based brazing material. The brazing cycle includes reaching a maximum vacuum level (the maximum vacuum level preferably ranges from $10^{-3}$ Torr to $10^{-5}$ Torr) within the vacuum brazing furnace. The brazing cycle also includes increasing a temperature within the vacuum brazing furnace to a maximum temperature (the maximum temperature preferably ranges from 1400° F. to 1600° F.) while at a maximum vacuum level, and then quickly dropping the temperature to a minimum temperature while quickly reducing the vacuum level to an ambient pressure (760 Torr). The brazing cycle preferably has a time period ranging from 200 to 300 minutes.

Figure 18:
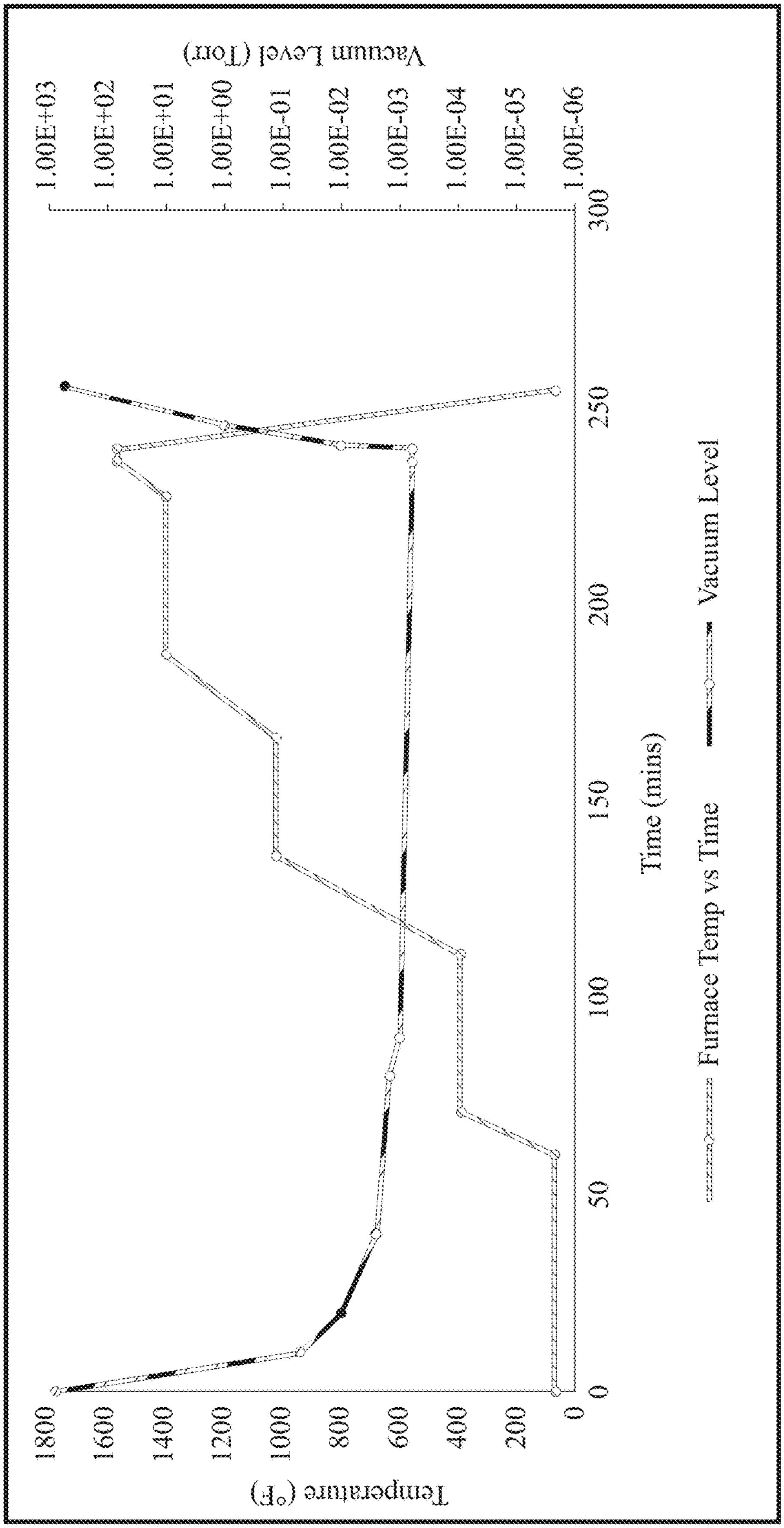
FIG. 18 is a graph time, temperature and vacuum pressure for a brazing cycle using a silver-based brazing material.

FIG. 18 is a graph 1100 of time, temperature and vacuum pressure for a brazing cycle within a vacuum brazing furnace to braze a first component of a golf club head to a second component of a golf club head using a silver-copper-titanium based brazing material.

Figure 19:
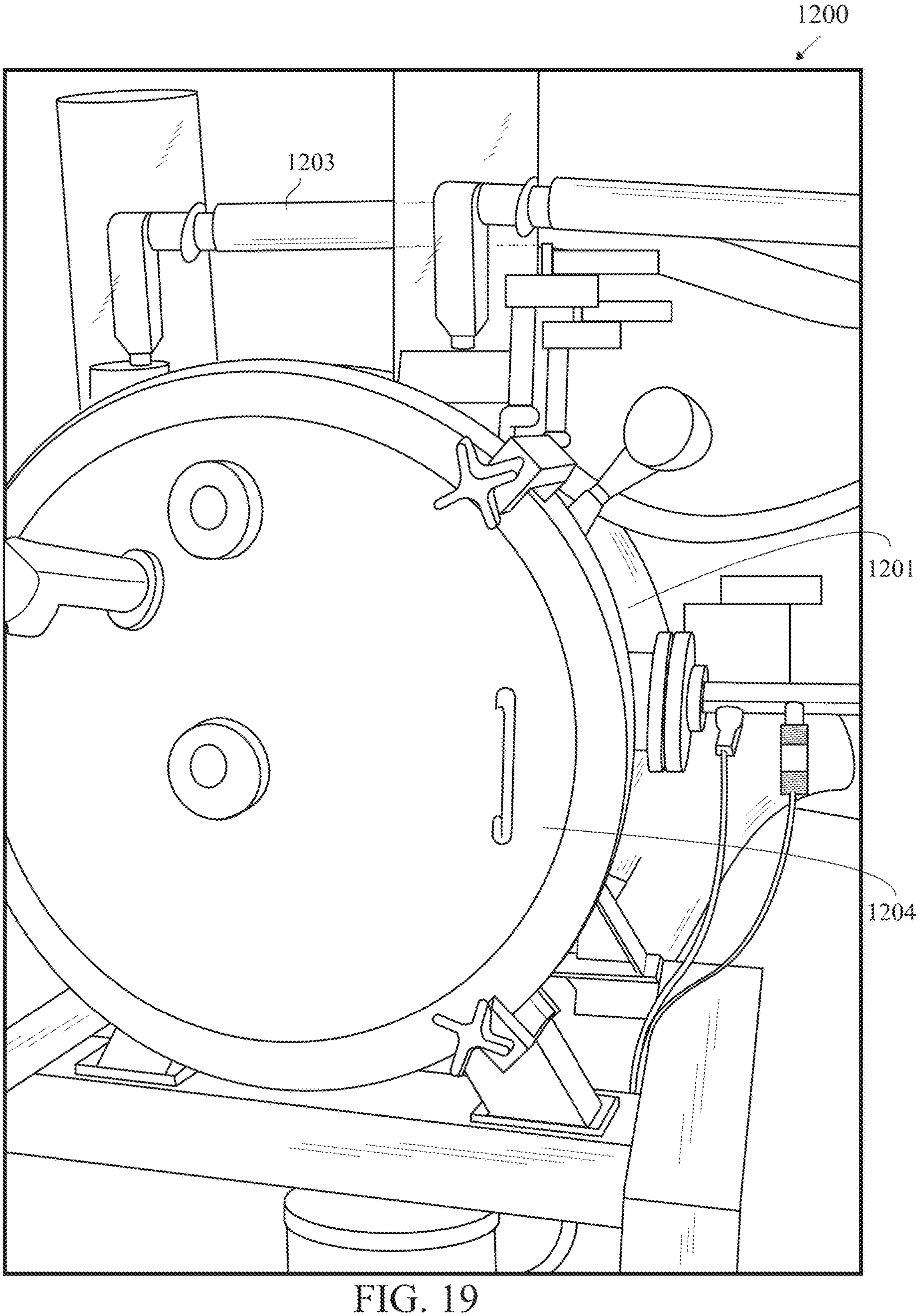
FIG. 19 is an illustration of a vacuum brazing furnace.

FIG. 19 is an illustration of a vacuum brazing furnace 1200 having a chamber 1201 for placement of the fixtured golf club head components therein for brazing. The chamber 1201 is accessed through a door 1204 and a vacuum line 1203 leads to a vacuum pump for evacuating the chamber 1201.

Figure 20:
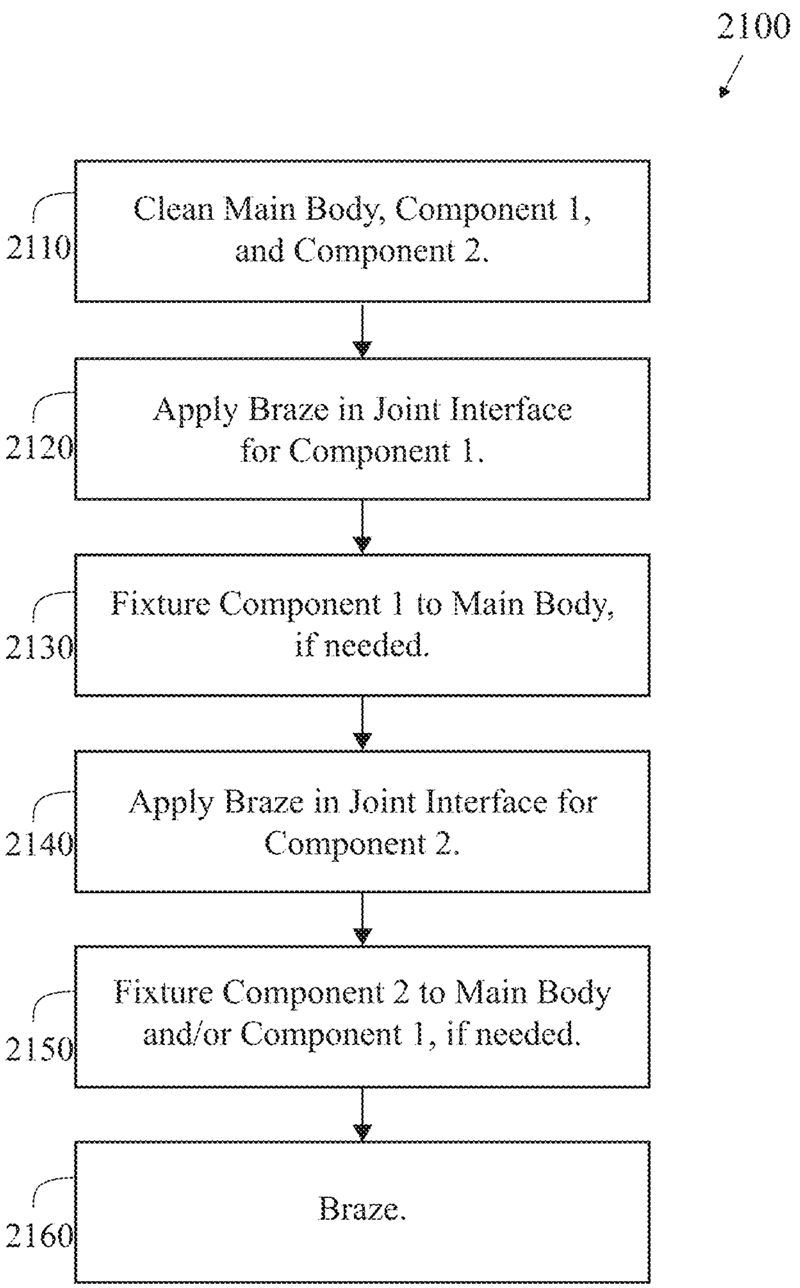
FIG. 20 is a process flow chart illustrating a method for joining golf club head components.

A flow chart of a method 2100 for joining multiple golf club components through co-brazing using a single brazing material is shown in FIG. 20. In one example, there is a main body, a first component (e.g. a face plate) and a second component (e.g. a weight). In a first step 2110, components made of dissimilar materials, such as titanium alloys, iron alloys, and tungsten alloys, are prepared for brazing, preferably by cleaning their surfaces and removing oxide layers by blasting, wire brush, or any means known to a person skilled in the art. In a second step 2120, a brazing material is applied to a joint interface surface of the first component. In a third step 2130, the first component is positioned to the main body and fixtured if needed. In a fourth step 2140, the brazing material is applied to a joint interface surface of the second component. In a fifth step 2150, the second component is positioned to the main body and fixture for brazing. In a sixth step 2160, a brazing cycle is performed to permanently affix the components together. It is preferable for the brazing cycle to be short so that the materials are heated and cooled quickly, thereby causing less beta phase to form on titanium (particularly 6-4) components.

Figure 21:
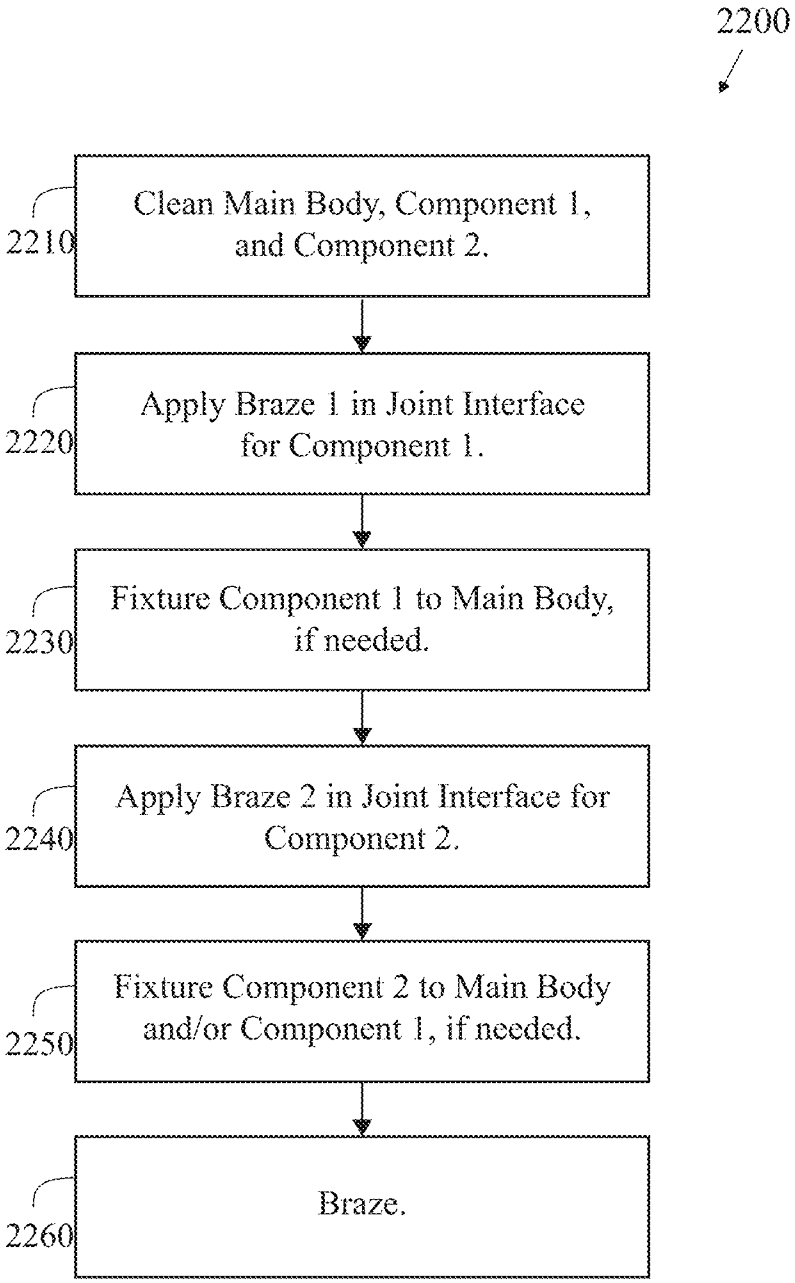
FIG. 21 is a process flow chart illustrating a method for joining golf club head components.

A flow chart of a method 2200 for joining multiple golf club components through co-brazing using multiple brazing materials is shown in FIG. 21. In one example, there is a main body, a first component (e.g. a face plate) and a second component (e.g. a weight). In a first step 2210, components made of dissimilar materials, such as titanium alloys, iron alloys, and tungsten alloys, are prepared for brazing, preferably by cleaning their surfaces and removing oxide layers by blasting, wire brush, or any means known to a person skilled in the art. In a second step 2220, a first brazing material, such as a silver-based brazing material, is applied to a joint interface surface of the first component. In a third step 2230, the first component is positioned to the main body and fixtured if needed. In a fourth step 2240, a second brazing material, such as a nickel-based brazing material such as BNi-2, BNi-7, or BNi-9, is applied to a joint interface surface of the second component. In a fifth step 2250, the second component is positioned to the main body and fixture for brazing. In a sixth step 2260, a brazing cycle is performed to permanently affix the components together. It is preferable for the brazing cycle to be short so that the materials are heated and cooled quickly, thereby causing less beta phase to form on titanium (particularly 6-4) components. The brazing cycle is preferably performed within a brazing furnace, and most preferably a vacuum brazing furnace. However, the brazing cycle may be performed in a brazing furnace with an inert atmosphere (e.g. hydrogen). Alternatively, the brazing cycle is performed using induction brazing or another brazing technique. The method comprises at least one of: the second brazing material is different than the first brazing material; or the first component is different than at least one of the second component or the third component.

One brazing material is a nickel-based brazing material such as nickel, BNi-2, BNi-7, or BNi-9. The nickel-based brazing material does not have low vaporization elements, so a hard vacuum can be used to conduct brazing, and nickel is about 20% of the price of silver so is much more cost effective for use in manufacturing. Nickel is soluble into titanium, so the surface of the titanium component may be wetted in an intermediate step between the cleaning and applying steps. Nickel-based brazing materials can also be used for steel and stainless-steel brazing.

Another brazing material is a copper-based brazing material selected from the group consisting of copper and a copper alloy (67.5% Cu/23.5% Mn/9% Ni) composed of copper, manganese and nickel such a Hi-Temp 095.

Another brazing material is a silver-based brazing material. The silver-based brazing material preferably comprises silver, copper, titanium and other elements. Pure silver has a vaporization temperature of 4013° F. at ambient pressure, and a vaporization temperature of 1558° F. at a pressure of $10^{-4}$ Torr.

Another brazing material is a silver-copper-titanium based brazing material primarily composed of silver, copper and titanium, and having trace amounts of cadium, zinc, phosphorus, lead and/or carbon. One such material is APA3 from Prince&Izant Company. Another brazing material is a titanium-based brazing material.

Another brazing material is a zirconium-based brazing material.

Figure 22:
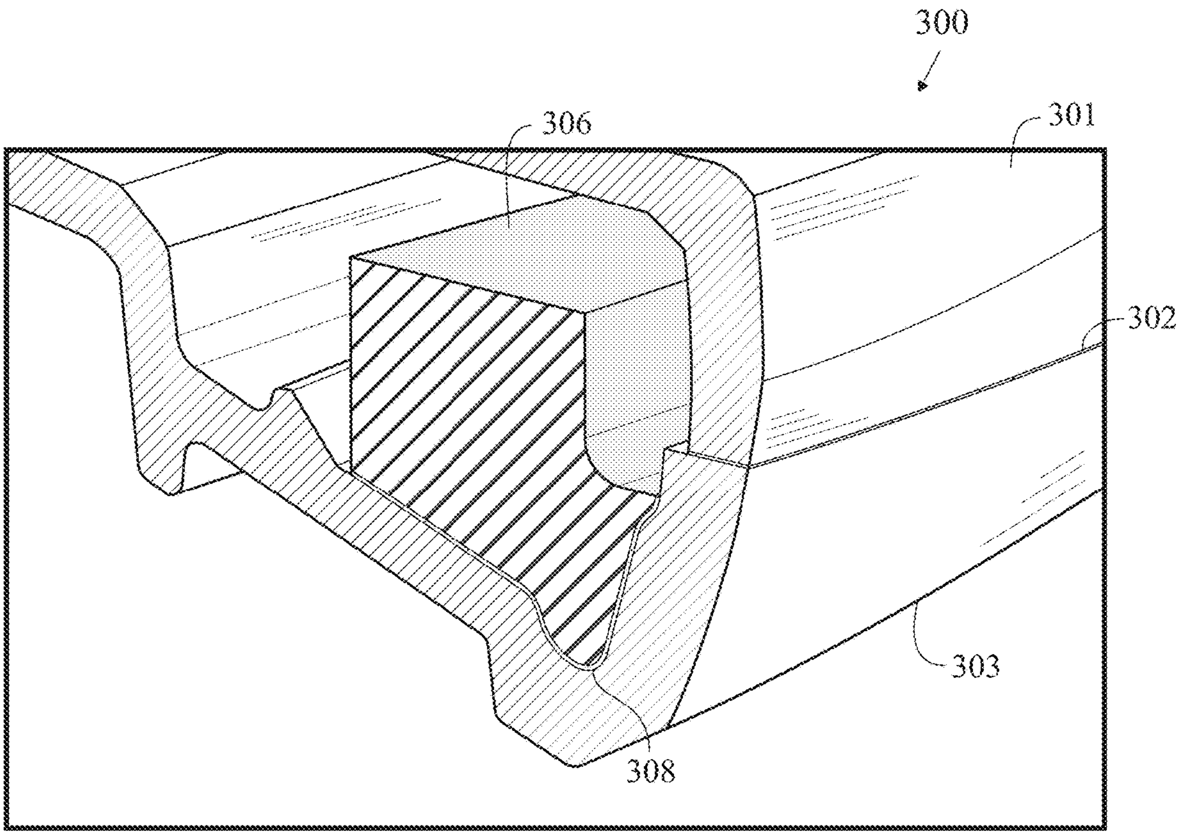
FIG. 22 is a cross sectional view of an iron-type golf club head with components joined by brazing.
Figure 23:
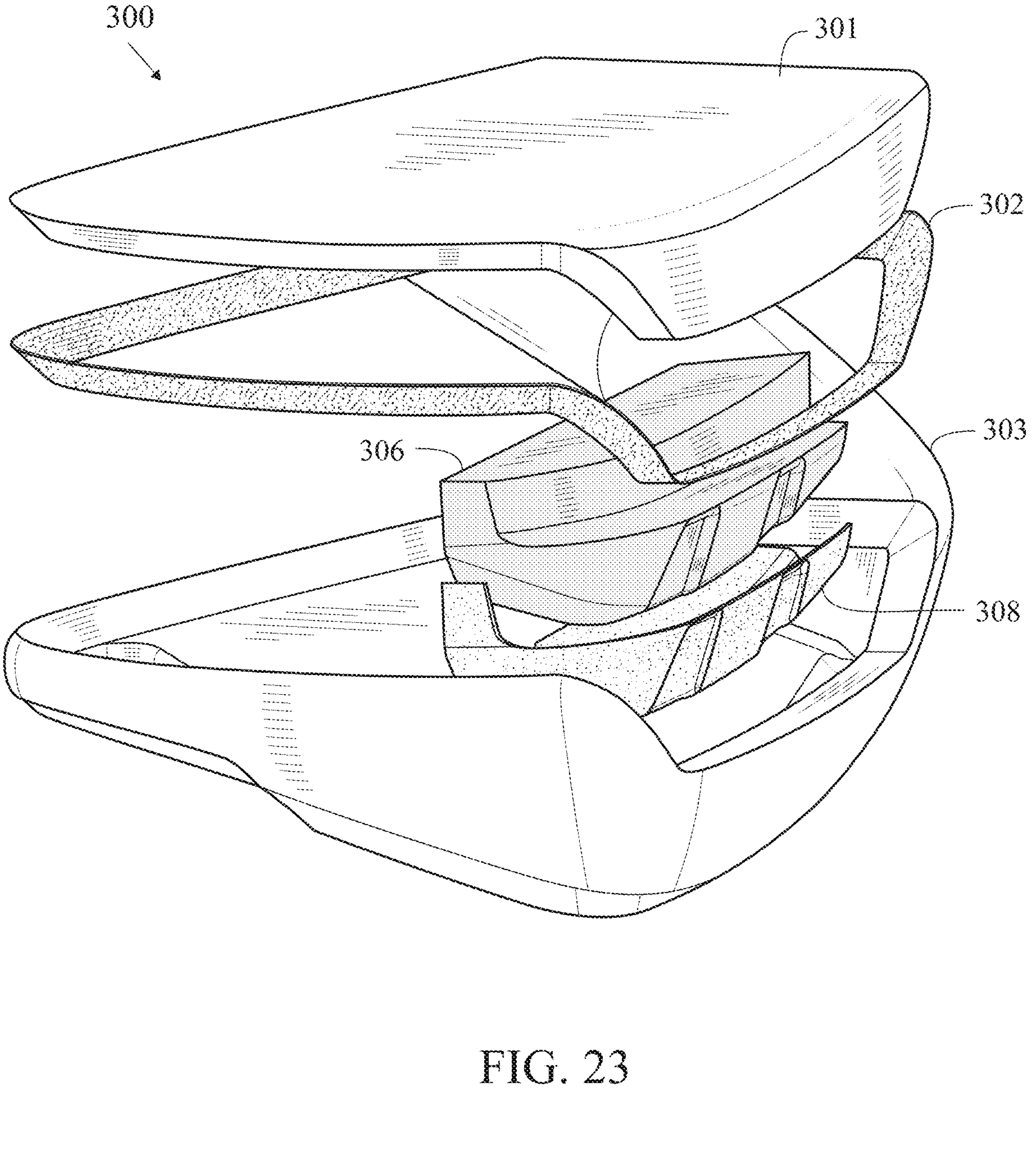
FIG. 23 is an exploded of an iron-type golf club head having components joined by brazing.

FIGS. 22 and 23 illustrate an exemplary high COR iron-type golf club 300 composed of components 301, 303 and 306 made of dissimilar materials using brazing materials 302 and 308, and assembled using one of the methods described above in FIGS. 20-21. In this embodiment, the main body component 303 is composed of a steel material, the face component 301 is composed of a titanium alloy material, preferably 6-4 titanium. The weight component 306 is composed of a tungsten alloy. Steel, when described herein, may include all steel variants, including stainless steel, carbon steel, and the like. Titanium, when described herein, may refer to pure titanium and titanium alloy may refer to all titanium alloys known to a person of ordinary skill in the art.

As shown in FIG. 23, the high COR iron-type golf club head 300 has a main body 303, a face component 301, a weight component 306, a first brazing material 302 and a second brazing material 308. In one embodiment, the face component 301 has a first attachment surface, which in this embodiment is an internal surface of the face component 301, and the weight component 308 has a second attachment surface. The second brazing material 308, in a paste form, is applied to the second attachment surface, and the weight component 306 is positioned within the main body 303. The first brazing material 302, in a paste form, is applied to the first attachment surface, and the face component 301 is positioned within the main body 303. The assembled iron-type golf club head 300 is fixtured within a vacuum brazing furnace. A brazing cycle within the vacuum brazing furnace is performed to braze the face insert 301 to the main body 303 and the weight component 306 to the main body 303 to form an iron type golf club head 300.

Figure 24:
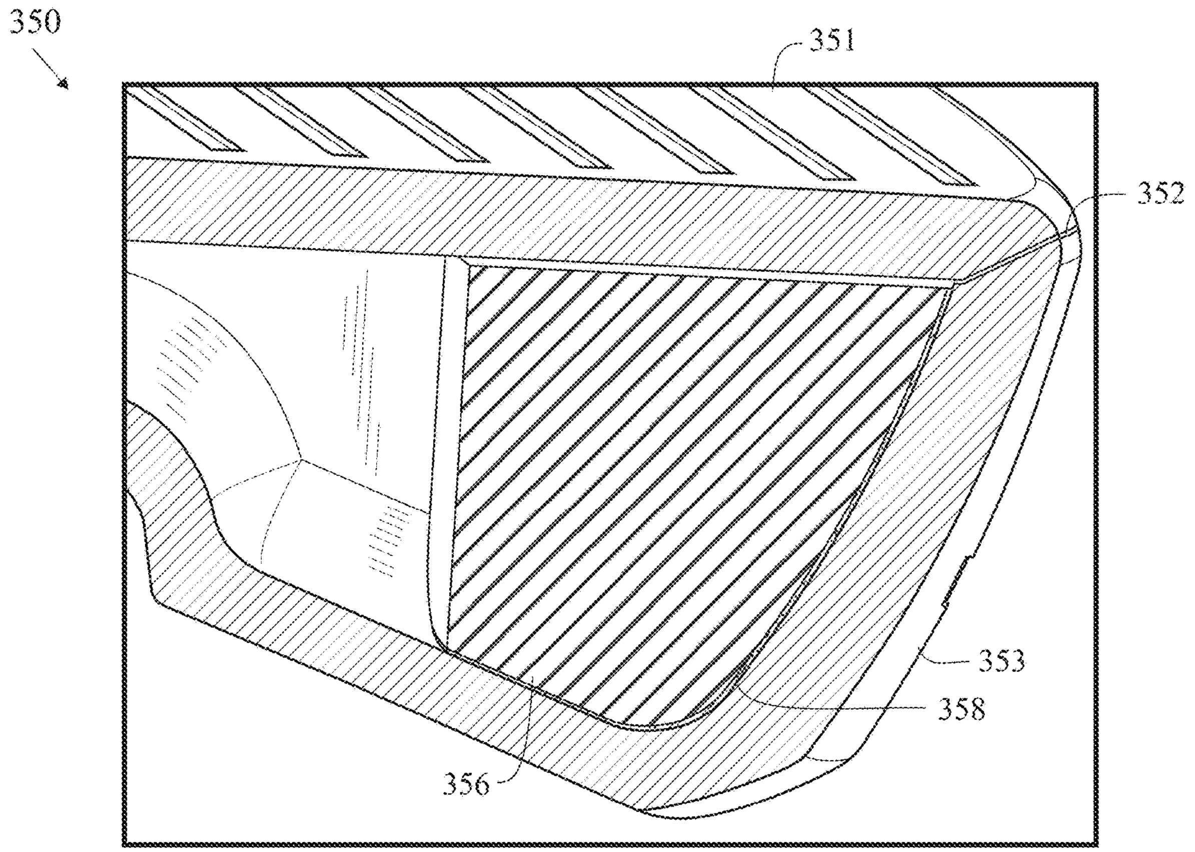
FIG. 24 is a cross-sectional view of an iron-type golf club head with parts joined by brazing.
Figure 25:
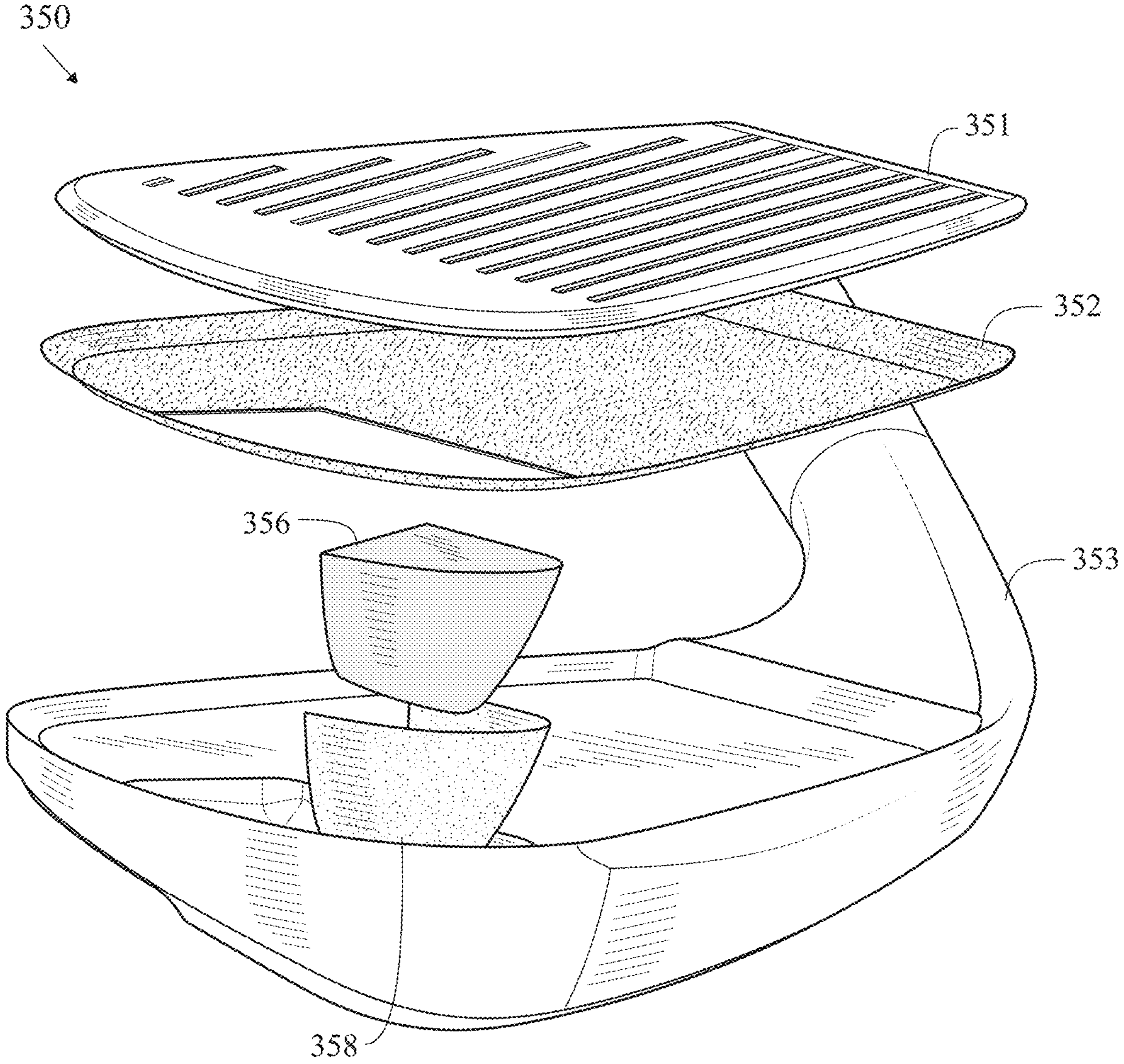
FIG. 25 is an exploded of an iron-type golf club head having components joined by brazing.

As shown in FIGS. 24-25, a low-COR iron-type golf club head 350 composed of components 351, 353 and 356 made of dissimilar materials using brazing materials 352 and 358, and assembled using one of the methods described above in FIGS. 20-21. In this embodiment, the main body component 353 is composed of a steel material, the face component 351 is composed of a titanium alloy material, preferably 6-4 titanium. The weight component 356 is composed of a tungsten alloy. Steel, when described herein, may include all steel variants, including stainless steel, carbon steel, and the like. Titanium, when described herein, may refer to pure titanium and titanium alloy may refer to all titanium alloys known to a person of ordinary skill in the art.

As shown in FIG. 25, the low COR iron-type golf club head 350 has a main body 353, a face component 351, a weight component 356, a first brazing material 352 and a second brazing material 358. In one embodiment, the face component 351 has a first attachment surface, which in this embodiment is an internal surface of the face component 351, and the weight component 358 has a second attachment surface. The second brazing material 358, in a paste form, is applied to the second attachment surface, and the weight component 356 is positioned within the main body 353. The first brazing material 352, in a paste form, is applied to the first attachment surface, and the face component 351 is positioned within the main body 353. The assembled iron-type golf club head 350 is fixtured within a vacuum brazing furnace. A brazing cycle within the vacuum brazing furnace is performed to braze the face insert 351 to the main body 353 and the weight component 356 to the main body 353 to form an iron type golf club head 350. Those skilled in the pertinent art will recognize that the first brazing material 352 may be similar to the second brazing material 358.

In a preferred embodiment 5-8 grams, and more preferably 5.5 to 7 grams of the brazing material paste is applied to a surface of the first component or second component to ensure a proper fill. Excess paste is preferably utilized to create a "bead" on the outside of the part that ground away to reveal a final joint (joining of the two components). In a preferred embodiment, 2.5 to 4 grams remain in the part after braze bead removal. A most preferred theoretical mass is only 0.6-0.8 grams of brazing material remaining in the part.

Aplin et al., U.S. Pat. No. 10,946,255 for *Methods Of Manufacturing Golf Club Heads*, is hereby incorporated by reference in its entirety.

Seluga et al., U.S. Pat. No. 10,569,146 for a *Golf Club Head With Face Dampening And Stress-Reduction Features*, is hereby incorporated by reference in its entirety.

Westrum et al., U.S. Pat. No. 11,090,534 for a *Golf Club Head Comprising Microscopic Bubble Material*, is hereby incorporated by reference in its entirety.

Seluga et al., U.S. Pat. No. 10,213,661 for a *Golf Club Head With Tubes Connecting Crown To Elongated Protrusion*, is hereby incorporated by reference in its entirety.

Myers et al., U.S. Pat. No. 9,987,527 for an Iron-Type Golf Club Head With Stiffening Rods, is hereby incorporated by reference in its entirety.

Seluga et al., U.S. Pat. No. 10,010,771 for an Iron-Type Golf Club Head With Elevated Weight Bar And Stress-Relieving Structures, is hereby incorporated by reference in its entirety.

Seluga et al., U.S. Pat. No. 10,039,965 for an Iron-Type Golf Club Head With Dampening Features, is hereby incorporated by reference in its entirety.

Ivanova et al., U.S. Pat. No. 9,861,863 for an Iron-Type Golf Club Head With Lightweight Hosel, is hereby incorporated by reference in its entirety.

Westrum, U.S. Pat. No. 9,675,852 for an Iron-Type Golf Club Head, is hereby incorporated by reference in its entirety.

Kim et al., U.S. Pat. No. 9,227,117 for an Adjustable Iron-Type Golf Club Head, is hereby incorporated by reference in its entirety.

Dawson et al., U.S. Pat. No. 9,233,281 for an Iron-Type Golf Club Head, is hereby incorporated by reference in its entirety.

Ivanova et al., U.S. Pat. No. 9,345,937 for an Iron-Type Golf Club Head, is hereby incorporated by reference in its entirety.

Griffin et al., U.S. Pat. No. 9,381,409 for a Multiple Material Iron, is hereby incorporated by reference in its entirety.

Kuhar et al., U.S. Pat. No. 9,381,408 for an Iron-Type Golf Club Head, is hereby incorporated by reference in its entirety.

Dawson et al., U.S. Pat. No. 8,821,313 for an Iron-Type Golf Club Head, is hereby incorporated by reference in its entirety.

Ivanova et al., U.S. Pat. No. 8,911,302 for an Iron-Type Golf Club Head, is hereby incorporated by reference in its entirety.

Power, U.S. patent application Ser. No. 18/240,994, filed on Aug. 31, 2023, for a Method Of Co-Brazing Golf Club Components, is hereby incorporated by reference in its entirety.

Power, U.S. patent application Ser. No. 18/238,304, filed on Aug. 25, 2023, for a Method Of Brazing Golf Club Components, is hereby incorporated by reference in its entirety.

Power, U.S. patent application Ser. No. 18/222,031, filed on Jul. 14, 2023, for a Method Of Brazing Golf Club Components, is hereby incorporated by reference in its entirety.

From the foregoing it is believed that those skilled in the pertinent art will recognize the meritorious advancement of this invention and will readily understand that while the present invention has been described in association with a preferred embodiment thereof, and other embodiments illustrated in the accompanying drawings, numerous changes, modifications and substitutions of equivalents may be made therein without departing from the spirit and scope of this invention which is intended to be unlimited by the foregoing except as may appear in the following appended claims. Therefore, the embodiments of the invention in which an exclusive property or privilege is claimed are defined in the following appended claims.

We claim as our invention the following:

1. A method for joining multiple iron-type golf club head components to form an iron-type golf club head, the method comprising:

positioning a first attachment surface of an iron-type body composed of a steel to a second attachment surface of a single material face component consisting of a titanium alloy, wherein a first brazing material is applied to the first attachment surface, wherein the first brazing material is a copper alloy based brazing material consisting of copper, manganese and nickel, wherein the iron-type body having an internal edge defining a recess, wherein the first attachment surface formed continuously around an entire perimeter portion of the body, and wherein the face component is disposed over the recess;

positioning a third attachment surface of a weight component to a fourth attachment surface of the iron-type body, wherein the weight component is composed of a tungsten material, wherein a second brazing material is applied to the third attachment surface, and wherein the second brazing material is a silver-based brazing material; and performing a single brazing cycle within a vacuum brazing furnace to braze the face component to the iron-type body and the weight component to the iron-type body;

wherein a miter joint is formed between the second attachment surface of the face component and the first attachment surface of the body and has an angle ranging from 10 degrees to 80 degrees relative to a plane of a rear surface of the face component, wherein the second attachment surface of the face component is formed continuously around an entire circumference of the rear surface of the face component, wherein the second attachment surface of the face component has a width ranging from 0.04 inch to 0.5 inch, and wherein the first attachment surface of the body has a width substantially matching the width of the second attachment surface of the face component.

2. The method according to claim 1 wherein a maximum vacuum level ranges from $10^{-2}$ Torr to $10^{-7}$ Torr, and the maximum temperature ranges from 1400° F. to 1800° F.

3. The method according to claim 1 wherein the brazing cycle has a time period ranging from 200 to 300 minutes.

4. The method according to claim 1 wherein the brazing cycle comprises creating a reducing environment within the vacuum brazing furnace.

5. The method according to claim 1 wherein the steel material is selected from the group consisting of C300 maraging steel, 1020 steel, 1025 steel, 1045 steel, 4130 steel, 4140 steel, and 4340 steel, 17-4 stainless steel, 304 stainless steel, 304L stainless steel, 321 stainless steel, 303 stainless steel, 316 stainless steel, 316L stainless steel, 420 stainless steel, 425 stainless steel, 425M stainless steel, 450 stainless steel, 455 stainless steel, 475 stainless steel, and HSR300 stainless steel.

6. The method according to claim 1 wherein the titanium alloy is selected from the group consisting of 6-4 titanium, 811 titanium, FS2S titanium, FS2S+ titanium, SP700 titanium, Ti 17, Ti 21, and 15-3-3-3 titanium.

7. The method according to claim 1 wherein the angle of the miter joint ranges from 25 degrees to 65 degrees relative to a plane of a rear surface of the face component.

8. The method according to claim 1 wherein the angle of the miter joint ranges from 30 degrees to 60 degrees relative to a plane of a rear surface of the face component.

9. The method according to claim 1 wherein the iron-type golf club head has a loft angle ranging from 15 degrees to 34 degrees.

10. The method according to claim 1 wherein the face component comprises a return portion.

* * * * *